(12) United States Patent
Ma et al.

(10) Patent No.: US 10,856,317 B2
(45) Date of Patent: Dec. 1, 2020

(54) SYSTEM AND METHOD FOR UPLINK COMMUNICATIONS

(71) Applicants: Jianglei Ma, Ottawa (CA); Liqing Zhang, Ottawa (CA)

(72) Inventors: Jianglei Ma, Ottawa (CA); Liqing Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 15/588,440

(22) Filed: May 5, 2017

(65) Prior Publication Data

US 2018/0139773 A1 May 17, 2018

Related U.S. Application Data

(60) Provisional application No. 62/423,740, filed on Nov. 17, 2016.

(51) Int. Cl.
*H04W 72/12* (2009.01)
*H04W 72/04* (2009.01)
*H04L 5/00* (2006.01)
*H04L 27/26* (2006.01)

(52) U.S. Cl.
CPC ....... *H04W 72/1284* (2013.01); *H04L 5/0007* (2013.01); *H04L 5/0037* (2013.01); *H04L 5/0042* (2013.01); *H04L 5/0044* (2013.01); *H04L 5/0053* (2013.01); *H04L 5/0094* (2013.01); *H04L 27/2602* (2013.01); *H04W 72/0453* (2013.01); *H04L 27/26* (2013.01)

(58) Field of Classification Search
CPC combination set(s) only.
See application file for complete search history.

(56) References Cited

U.S. PATENT DOCUMENTS

| 2014/0036961 | A1* | 2/2014 | Arnott | H04B 1/7143 |
| | | | | 375/133 |
| 2014/0192767 | A1* | 7/2014 | Au | H04W 72/0413 |
| | | | | 370/330 |
| 2016/0286551 | A1 | 9/2016 | Lee et al. | |
| 2016/0294498 | A1 | 10/2016 | Ma et al. | |
| 2017/0156140 | A1* | 6/2017 | Islam | H04L 5/0044 |
| 2018/0115972 | A1* | 4/2018 | Huang | H04L 5/0053 |

(Continued)

FOREIGN PATENT DOCUMENTS

| CN | 102111886 A | 6/2011 |
| WO | 2015074719 A1 | 5/2015 |
| WO | 2016004634 A1 | 1/2016 |

OTHER PUBLICATIONS

3GPP TSG RAN WG1 Meeting #88bis, "WF on 1-symbol NR-PUCCH", LG Electronics, Intel, R1-1706517, Agenda Item: 8.1.3.2.1, Apr. 3-7, 2017, Spokane, U.S.A., pp. 1-3.

(Continued)

*Primary Examiner* — Yee F Lam

(57) ABSTRACT

A method for data receiving at a base station is provided. The base station receives data using a first transmission resource in a first symbol of an uplink control channel from a first UE. The base station receives UL data or control information using a second transmission resource in a second symbol of the uplink control channel from a second UE as well. The first symbol and the second symbol have different numerologies at a same sub band.

25 Claims, 12 Drawing Sheets

(56) References Cited

U.S. PATENT DOCUMENTS

| | | | | |
|---|---|---|---|---|
| 2018/0131493 | A1* | 5/2018 | Luo | H04L 5/0007 |
| 2018/0152905 | A1* | 5/2018 | Ramanujam | H04L 27/2613 |
| 2019/0229880 | A1* | 7/2019 | Lin | H04L 5/003 |
| 2020/0169375 | A1* | 5/2020 | Yi | H04L 5/001 |
| 2020/0178082 | A1* | 6/2020 | Wang | H04W 72/1268 |

OTHER PUBLICATIONS

3GPP TSG RAN WG1 Meeting #88bis, "WF on 1-symbol NR-PUCCH", LG Electronics, Intel, NTT DOCOMO, CATT, ETRI, Panasonic, R1-1706604, Agenda Item: 8.1.3.2.1, Apr. 3-7, 2017, Spokane, U.S.A., pp. 1-3.

3GPP TSG RAN WG1 Meeting #88bis, "WF on NR PUCCH Short Format with One Symbol", ZTE, ZTE Microelectronics, Qualcomm, IITH, CEWiT, Reliance Jio, IIRM, Tejas network, R1-1706634, Agenda Item: 8.1.3.2.1, Apr. 3-7, 2017, Spokane, U.S.A, pp. 1-2.

Nokia Alcatel-Lucent Shanghai Bell: "On the transmission DL control information and data using different numerologies", 3GPP Draft; R1-1613023, Nov. 2016, XP051176949, total 4 pages.

Qualcomm Incorporated: "Scaled Numerology Control Designfor NR" 3GPP Draft; R1-1612019, Nov. 2016, XP051175982, total 10 pages.

Huawei et al: "Overview of URLLC support in NR", 3GPP Draft; R1-1608843, Oct. 2016, XP051148897, total 7 pages.

NTT Docomo: "Multiplexing mechanism for eMBB and URLLC", 3GPP Draft; R1-1610082, Oct. 2016, XP051150107, total 6 pages.

Ericsson: "Summary of e-mail discussions on uplink control signaling", 3GPP Draft; R1-1612916, Nov. 2016, XP051190932, total 22 pages.

* cited by examiner

SYSTEM AND METHOD FOR UPLINK COMMUNICATIONS

CROSS-REFERENCE TO RELATED APPLICATION

The present application claims the benefit of U.S. Provisional Application Ser. No. 62/423,740, entitled "System and Method for uplink transmission", filed on Nov. 17, 2016, the entire contents of which are incorporated herein by reference.

TECHNICAL FIELD

The present application relates generally to wireless communications, and, in particular embodiments, to uplink communications.

BACKGROUND

In some wireless communication systems, user equipment (UE) wirelessly communicate with one or more base stations. A wireless communication from a UE to a base station is referred to as an uplink (UL) communication. A wireless communication from a base station to a UE is referred to as a downlink (DL) communication. Resources are required to perform uplink and downlink communications. For example, a base station may wirelessly transmit data to a UE in a downlink communication at a particular frequency for a particular duration of time. The frequency and time duration are examples of resources.

A base station allocates resources for downlink communications to the UEs that are served by the base station. The wireless communications may be performed by transmitting orthogonal frequency-division multiplexing (OFDM) symbols, for example.

Some UEs served by a base station may need to receive data from the base station with lower latency than other UEs served by the base station. For example, a base station may serve multiple UEs, including a first UE and a second UE. The first UE may be a mobile device carried by a human who is using the first UE to browse on the Internet. The second UE may be equipment on an autonomous vehicle driving on a highway. Although the base station is serving both UEs, the second UE may need to receive data with lower latency compared to the first UE. The second UE may also need to receive its data with higher reliability than the first UE. The second UE may be a UE with ultra-reliable low latency communication (URLLC) traffic, whereas the first UE may be a UE with enhanced mobile broadband (eMBB) traffic. Further, some UEs may receive several types of traffic from the base station, e.g., a UE may receive both URLLC and eMBB traffic.

UEs that are served by a base station and that require lower latency communication will be referred to as "low latency UEs." Other UEs served by the base station will be referred to as "latency tolerant UEs." For example, UL data to be transmitted to the base station from a low latency UE will be referred to as "low latency data," and data to be transmitted to the base station from a latency tolerant UE will be referred to as "latency tolerant data."

In wireless communications networks, such as networks that adhere to the known Long-Term Evolution (LTE) standard, transmissions over the wireless channel use preselected numerology. The term numerology is used to refer to the parameters that are used to define the waveform transmission. Numerology parameters include the sub-carrier spacing, the length of a cyclic prefix, the length of an OFDM symbol, the number of symbols contained in a Transmission Time Interval (TTI), and/or the duration of the TTI in milliseconds (ms). LTE networks typically support a 15 kHz sub carrier spacing across all transmission frequencies, with a TTI of 1 ms. It will be understood that a 15 kHz spacing typically results in a symbol rate of 66.7 μs, and that the length of a Cyclic Prefix is 4.69 μs.

For one example, the single subcarrier spacing may be limiting in very high speed mobility scenarios (e.g., 500 Km/h), which may incur high Doppler frequency shift. For another example, the single subcarrier spacing may be limiting in scenarios in which high radio frequency bands, such as 10 GHz bands, are employed, where phase noise may lead to large frequency shift. In such cases, 15 kHz may not be wide enough to accommodate the Doppler impact in frequency domain. On the other hand, low cost devices employing Machine-Type Communications (MTC) or Device to Device (D2D) communications may use narrower frequency bandwidth to enhance coverage and save energy. In such cases, subcarrier spacing can be narrower than that used in networks such as LTE.

It is desired to have a base station and suitable frame structure that can accommodate the use of the same time-frequency resources by both low latency UEs and latency tolerant UEs.

SUMMARY

One aspect of the present disclosure relates to a method that is performed by a base station in a communication network. The method involves receiving, from a first UE, data using a first transmission resource in a first symbol of a UL control channel, and receiving, from a second UE, UL data or control information using a second transmission resource in a second symbol of the uplink control channel. The first symbol and the second symbol have different numerologies at a same sub-band.

The first symbol could include two or more symbols, shorter than the first symbol, and the two or more shorter symbols could have scalable numerologies associated with the first symbol.

Such a method could also involve dynamic splitting, by the base station, of the first symbol into the two or more shorter symbols, or pre-configured splitting, by the base station, of the first symbol into the two or more shorter symbols.

In an embodiment, the method involves dividing, by the base station, the sub-band into at least a first partial sub-band and a second partial sub-band.

A method could also involve adjusting, by the base station, a division location between the first partial sub-band and the second partial sub-band.

Another embodiment involves adjusting, by the base station, a division range of the sub-band as zero to set one of the partial sub-bands to zero.

Each of the first partial sub-band and the second partial sub-band could include a first group of symbols for data transmission and a second group of symbols for control message transmission.

In some embodiments, each of the first symbol and the second symbol includes multiple transmission regions assigned for grant based UE transmission, grant free UE transmission or a combination of grant based UE transmission and grant free UE transmission.

The multiple transmission regions could provide multiple scheduling request opportunities for UEs in a time period on a dedicated basis, on a contention basis, or both.

The multiple transmission regions could also or instead provide UL sounding signals for UEs in a time period on a dedicated basis, on a contention basis, or both.

The first UE and the second UE could be the same UE or different UEs.

The UL control channel could comprise a 1-symbol short-PUCCH or a 2-symbol PUCCH channel.

In an embodiment, the data received from the first UE includes associated PUSCH transmissions, and the data and/or control information received from the second UE includes associated PUSCH and/or PUCCH transmissions.

A non-transitory processor-readable medium storing instructions which, when executed by one or more processors, cause the one or more processors to perform a method as disclosed herein. In an embodiment, the method includes receiving at a base station in a communication network, from a first UE, data using a first transmission resource in a first symbol of a UL control channel. The method also involves receiving at the base station, from a second UE, UL data or control information using a second transmission resource in a second symbol of the uplink control channel. The first symbol and the second symbol have different numerologies at a same sub-band.

Another aspect relates to a network device that includes a processor and a non-transitory computer readable storage medium storing programming for execution by the processor. The programming includes instructions to perform actions in accordance with a method as disclosed herein. The method involves receiving, from a first UE, data using a first transmission resource in a first symbol of a UL control channel, and receiving, from a second UE, UL control information using a second transmission resource in a second symbol of the uplink control channel. The first symbol and the second symbol have different numerologies at a same sub-band.

The first symbol could include two or more symbols, shorter than the first symbol, and the two or more shorter symbols could have scalable numerologies associated with the first symbol.

The programming could include instructions to perform dynamic splitting of the first symbol into the two or more shorter symbols; or pre-configured splitting of the first symbol into the two or more shorter symbols.

In an embodiment, the programming includes instructions to perform dividing the sub-band into at least a first partial sub-band and a second partial sub-band.

The programming could also include instructions to perform adjusting a division location between the first partial sub-band and the second partial sub-band.

In another embodiment, the programming includes instructions to perform the adjusting by adjusting a division range of the sub-band as zero to set one of the partial sub-bands to zero.

Each of the first partial sub-band and the second partial sub-band could include a first group of symbols for data transmission and a second group of symbols for control message transmission.

In some embodiments, each of the first symbol and the second symbol includes multiple transmission regions assigned for grant based UE transmission, grant free UE transmission or a combination of grant based UE transmission and grant free UE transmission.

The multiple transmission regions could provide multiple scheduling request opportunities for UEs in a time period on a dedicated basis, on a contention basis, or both.

The multiple transmission regions could also or instead provide UL sounding signals for UEs in a time period on a dedicated basis, on a contention basis, or both.

The first UE and the second UE could be the same UE or different UEs.

The UL control channel could comprise a 1-symbol short-PUCCH or a 2-symbol PUCCH channel.

In an embodiment, the data received from the first UE includes associated PUSCH transmissions, and the data and/or control information received from the second UE comprises associated PUSCH and/or PUCCH transmissions.

A further aspect of the present disclosure relates to a method performed by a UE. The method involves receiving a UL control channel assignment from a base station in a communication network. The UL control channel assignment indicates a first transmission resource in a first symbol of the uplink control channel, the uplink control channel includes at least the first symbol and a second symbol, and the first symbol and the second symbol have different numerologies at a same sub-band. The method also involves transmitting data or a combination of data and control information using the first transmission resource in the first symbol of the uplink control channel to the base station.

The first symbol could include two or more symbols, shorter than the first symbol, that have scalable numerologies associated with the first symbol.

Each of the first symbol and the second symbol could include multiple transmission regions assigned for grant based UE transmission, grant free UE transmission or a combination of grant based UE transmission and grant free UE transmission.

The multiple transmission regions could provide multiple scheduling request opportunities for UEs in a time period on a dedicated basis, on a contention basis, or both.

The multiple transmission regions could also or instead provide UL sounding signals for UEs in a time period on a dedicated basis, on a contention basis, or both.

The sub-band could be divided into at least a first partial sub-band and a second partial sub-band.

Each of the first partial sub-band and the second partial sub-band could include a first group of symbols for data transmission and a second group of symbols for control message transmission.

The UL control channel could be a 1-symbol short-PUCCH or a 2-symbol PUCCH channel.

The data could include associated PUSCH transmissions and the combination of data and control information could include associated PUSCH and PUCCH transmissions.

A further aspect relates to a UE that includes a processor a non-transitory computer readable storage medium storing programming for execution by the processor. The programming includes instructions to perform actions in accordance with a method. The method involves receiving a UL control channel assignment from a base station in a communication network. The UL control channel assignment indicates a first transmission resource in a first symbol of the uplink control channel, the uplink control channel includes at least the first symbol and a second symbol, and the first symbol and the second symbol have different numerologies at a same sub-band. The method also involves transmitting data or a combination of data and control information using the first transmission resource in the first symbol of the uplink control channel to the base station.

The first symbol could include two or more symbols, shorter than the first symbol, that have scalable numerologies associated with the first symbol.

Each of the first symbol and the second symbol could include multiple transmission regions assigned for grant based UE transmission, grant free UE transmission or a combination of grant based UE transmission and grant free UE transmission.

The multiple transmission regions could provide multiple scheduling request opportunities for UEs in a time period on a dedicated basis, on a contention basis, or both.

The multiple transmission regions could also or instead provide UL sounding signals for UEs in a time period on a dedicated basis, on a contention basis, or both.

The sub-band could be divided into at least a first partial sub-band and a second partial sub-band.

Each of the first partial sub-band and the second partial sub-band could include a first group of symbols for data transmission and a second group of symbols for control message transmission.

The UL control channel could be a 1-symbol short-PUCCH or a 2-symbol PUCCH channel.

The data could include associated PUSCH transmissions and the combination of data and control information could include associated PUSCH and PUCCH transmissions.

A non-transitory processor-readable medium storing instructions which, when executed by one or more processors, cause the one or more processors to perform a method as disclosed herein. In an embodiment, the method includes receiving a UL control channel assignment from a base station in a communication network. The UL control channel assignment indicates a first transmission resource in a first symbol of the uplink control channel, the uplink control channel includes at least the first symbol and a second symbol, and the first symbol and the second symbol have different numerologies at a same sub-band. The method also involves transmitting data or a combination of data and control information using the first transmission resource in the first symbol of the uplink control channel to the base station.

BRIEF DESCRIPTION OF THE DRAWINGS

For a more complete understanding of embodiments of the present invention, and potential advantages thereof, reference is now made to the following description taken in conjunction with the accompanying drawings, in which.

DETAILED DESCRIPTION OF ILLUSTRATIVE EMBODIMENTS

Figure 1:
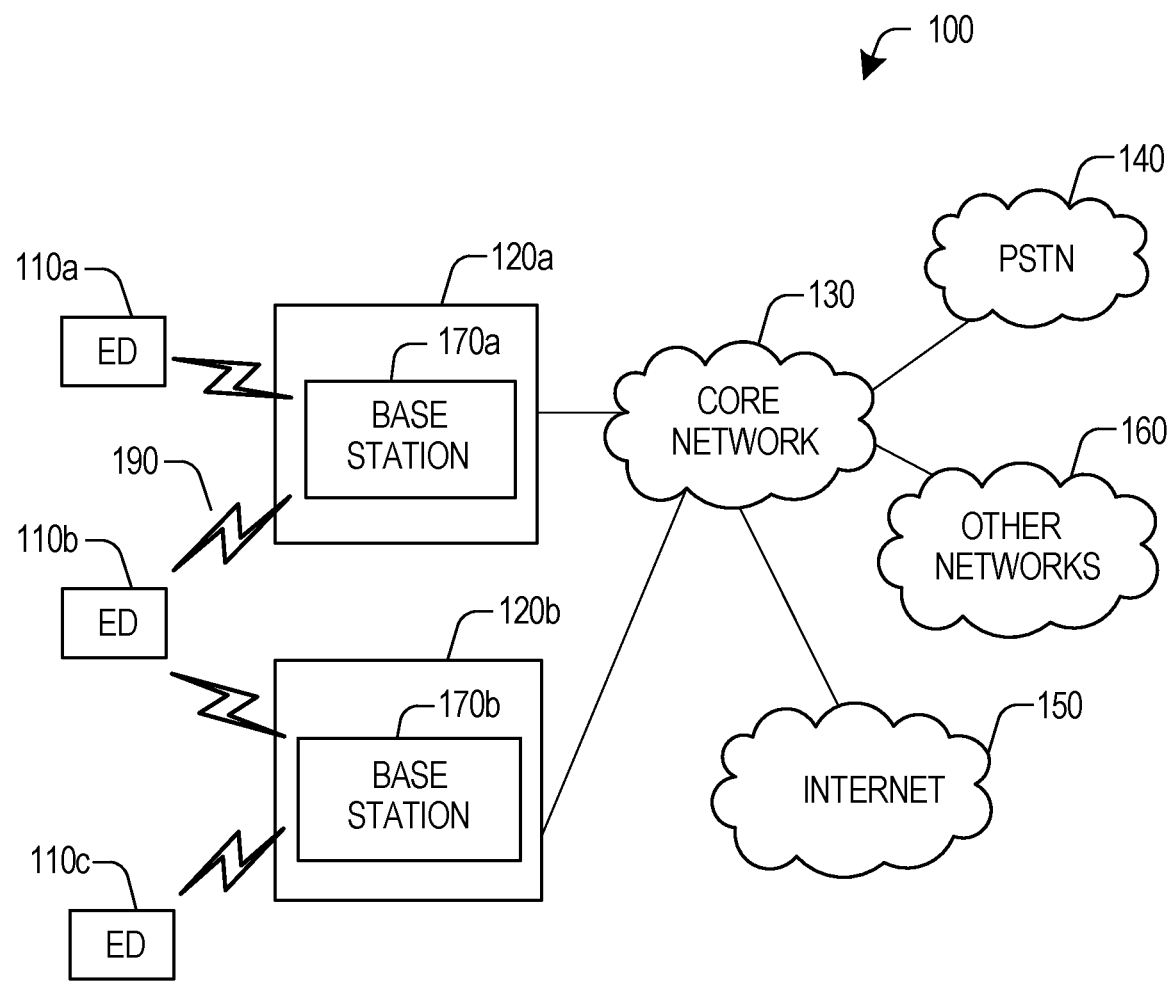
FIG. 1 illustrates a block diagram of a wireless network.

FIG. 1 illustrates an example communication system 100. In general, the system 100 enables multiple wireless or wired users to transmit and receive data and/or other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110*a*-110*c*, radio access networks (RANs) 120*a*-120*b*, a core network 130, a public switched telephone network (PSTN) 140, the Internet 150, and other networks 160. While certain numbers of these components or elements are shown in FIG. 1, any number of these components or elements may be included in the system 100. In other embodiments, a communication system might not include all of these components or elements.

The EDs 110*a*-110*c* are configured to operate and/or communicate in the system 100. For example, the EDs 110*a*-110*c* are configured to transmit and/or receive via wireless or wired communication channels. Each ED 110*a*-110*c* represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device, for example. References herein to UEs are intended to be inclusive of all of these types of EDs.

The RANs 120*a*-120*b* here include base stations 170*a*-170*b*, respectively. Each base station 170*a*-170*b* is configured to wirelessly interface with one or more of the EDs 110*a*-110*c* to enable access to the core network 130, the PSTN 140, the Internet 150, and/or the other networks 160. For example, the base stations 170*a*-170*b* may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 110a-110c are configured to interface and communicate with the internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed, having multiple transceivers for each cell.

The base stations 170a-170b communicate with one or more of the EDs 110a-110c over one or more air interfaces 190 using wireless communication links. The air interfaces 190 may utilize any suitable radio access technology, examples of which will be apparent to those familiar with wireless communications.

It is contemplated that the system 100 may use multiple channel access types or functionality, including such schemes as described above. In particular embodiments, the base stations and EDs implement LTE, LTE-A, LTE-B, and/or new $5^{th}$ Generation (5G) which is also known as the 5G New Radio (NR). Of course, other multiple access schemes and wireless protocols may be utilized.

The RANs 120a-120b are in communication with the core network 130 to provide the EDs 110a-110c with voice, data, application, Voice over Internet Protocol (VoIP), and/or other services. Understandably, the RANs 120a-120b and/or the core network 130 may be in direct or indirect communication with one or more other RANs (not shown). The core network 130 may also serve as a gateway access for other networks (such as the PSTN 140, the Internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 150.

Although FIG. 1 illustrates one example of a communication system, various changes may be made to FIG. 1. For example, the communication system 100 could include any number of EDs, base stations, networks, or other components in any suitable configuration.

Figure 2A:
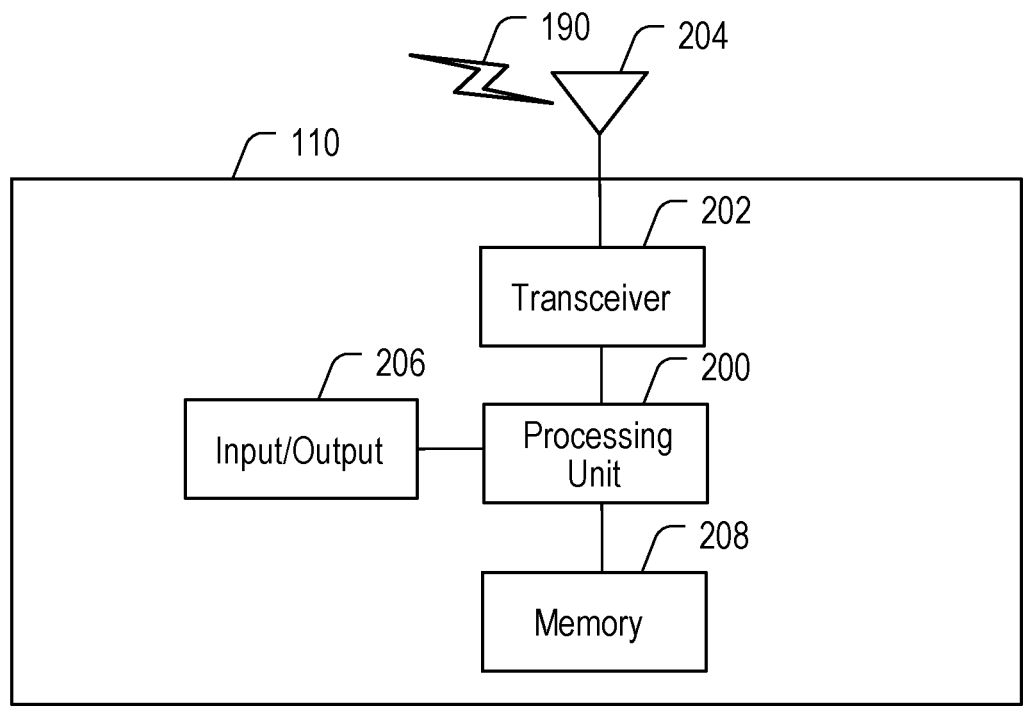
FIG. 2A illustrates an example electronic device (ED) structure according to FIG. 1.
Figure 2B:
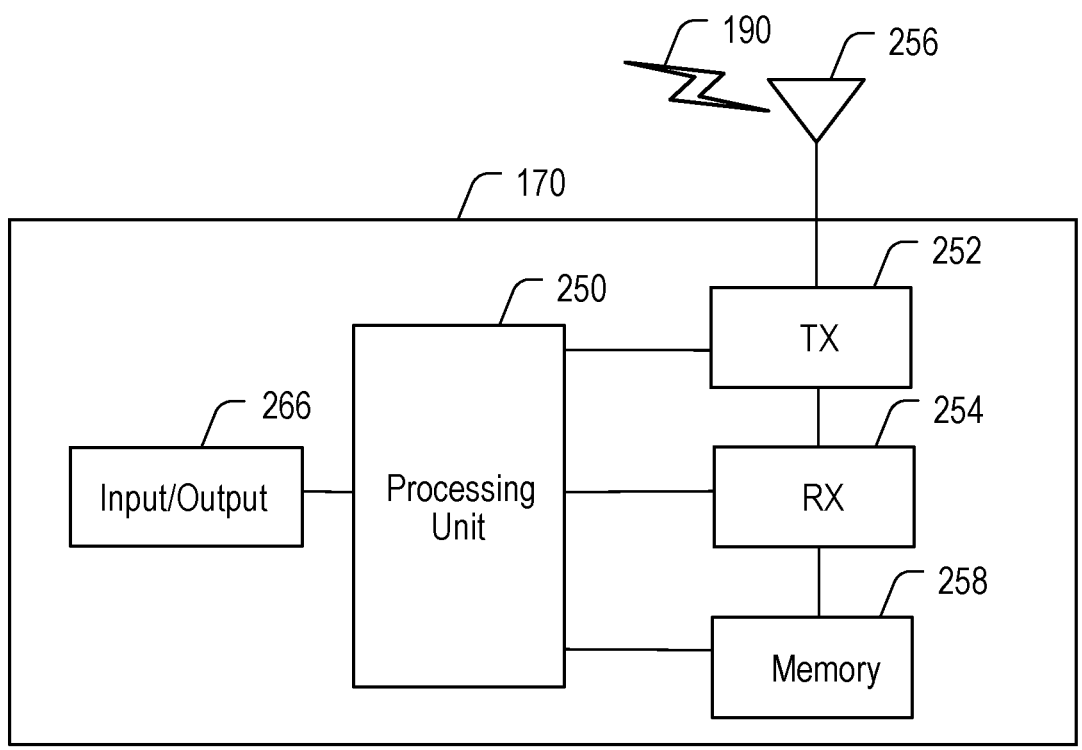
FIG. 2B illustrates an example base station structure according to FIG. 1.

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above or elsewhere herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the Internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110 in an embodiment. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A scheduler 253, which would be understood by one skilled in the art, is coupled to the processing unit 250. The scheduler 253 could be included within or operated separately from the base station 170. The processing unit 250 implements various processing operations of the base station 170, such as signal coding, data processing, power control, input/output processing, or any other functionality. The processing unit 250 can also support the methods and teachings described in more detail above or elsewhere herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

In conventional wireless networks, fixed numerologies have been employed to allow for ease of design. The parameters of a fixed numerology are typically set based on an understanding of the normal usage parameters of the network. In future networks, it might be desirable to serve a more diverse set of needs than in conventional wireless networks. Future networks may operate at a variety of different frequencies and serve a variety of different devices, for example.

Satisfying the diverse requirements for future wireless networks, such as fifth generation (5G) wireless networks, may be accomplished according to multiple approaches. In a first approach, which may be considered backward compatible with LTE, sampling frequencies and subcarrier frequencies are selected as integer multiples of the sampling frequencies and subcarrier frequencies already established for LTE. In a second approach, which may be considered to have so-called forward compatibility, the sampling frequencies and subcarrier frequencies are closely related to the sampling frequencies and subcarrier frequencies set for LTE, but are non-integer multiples.

For the first approach, the backward compatible with LTE solution, there are two versions of solutions, based on how many symbols and cyclic prefix (CP) lengths are in a sub-frame or transmission time interval. First version solutions are strictly compatible with LTE and involve using seven symbols or "7(1,6)" symbols in a sub-frame. The notation 7(1,6) represents a scheme with a first CP length for one symbol among the seven symbols and a second CP length for the other six symbols. For strict compatibility with LTE, the two CP lengths and the CP overhead in the base subcarrier spacing of 15 kHz are arranged to be the same as the two CP lengths and the CP overhead of current LTE. The second version solutions may be seen as closely compatible to LTE in the sense that their CP overhead and seven symbols in a sub-frame are the same as the CP overhead and the number of symbols used for current LTE, however, the symbols with different CP lengths are distributed in a manner distinct from LTE, e.g., 7(3,4) and 7(2,5).

In LTE, the parameter transmission time interval (TTI) is used to refer to the transmission time for a defined set of OFDM symbols. In some examples, TTI can also be referred to as a "transmission time unit (TTU)" or "sub-frame duration", which indicates the physical (PHY) layer symbol and frame time structure. Similar to TTI, TTU and "sub-frame duration" are each equal to the sum of the useful symbol duration and any symbol overhead such as cyclic prefix CP time for all of the OFDM symbols that are included in a set. For the second approach, with so-called forward compatibility, a flexible number of symbol configurations may be considered per transmission time interval (TTI). For any base subcarrier spacing (SS), any number of symbols per TTI can be configured. This may be referred to as a discretionary N (dN) solution, based on the diverse requirements of applications, such as latency, control/data, time-division duplexing/frequency-division duplexing (TDD/FDD) configurations, and co-existence, etc. As will be addressed hereinafter, the term "co-existence" relates to two or more sub-bands, in use for a given connection, employing compatible numerologies.

In example embodiments, for backward and forward compatibility solutions, the design methodology and criteria are as follows: for any base subcarrier spacing (15 kHz, 16.875 kHz, 17.5 kHz, 22.5 kHz, 16.5 kHz, etc.), the integer scalable subcarrier spacing (SS) values have an inversely scalable relationship over the CPs for a given CP overhead. Moreover, the integer scalable SS values have an inversely scalable relationship over both CPs and TTIs for a given number of symbols and given CP overhead. A minimum TTI (or basic TTI unit) is the smallest schedulable time unit. Multiple minimum TTIs can be concatenated to form larger TTIs, and one schedule grant could include multiple minimum TTIs. More generally, larger TTIs can be formed from a concatenation of smaller TTIs, where a minimum TTI consists of the minimum number of symbols that is valid for implementation, and is configurable in the TTI in such base subcarrier spacing. For one example, a scheme using 15 kHz subcarrier spacing is valid with seven symbols per TTI to make the scheme backward compatible to LTE. For another example, a scheme using 16.875 kHz subcarrier spacing is valid with one symbol per TTI for the implementation. The parameter (e.g., SS, TTI, CP) configurations are based on the diverse requirements of applications, such as latency, control/data, TDD/FDD configurations, and/or co-existence, etc.

In example embodiments, a communications network is provided that employs an OFDM transmission system in which the OFDM transmission parameters, such as subcarrier spacing parameter, can be configured to accommodate for different requests that may be placed on the network. Such requests may be related to factors such as speed of user equipment (UE), use of high frequency bands, or use of low cost, narrowly spaced frequency bandwidth communications devices. In this regard, OFDM numerology schemes are described herein that can be applied to radio frame structures for both FDD and TDD modes in a wireless network. Conveniently, the OFDM numerology schemes may permit one or more of: multiple subcarrier spacing options; multiple transmission time interval (TTI) options; multiple cyclic prefix (CP) options; multiple carrier bandwidth options; and multiple fast Fourier Transform (FFT) sizes. Accordingly, the OFDM numerology schemes may be flexible enough to satisfy different requirements that may arise in the wireless network.

Figure 3:
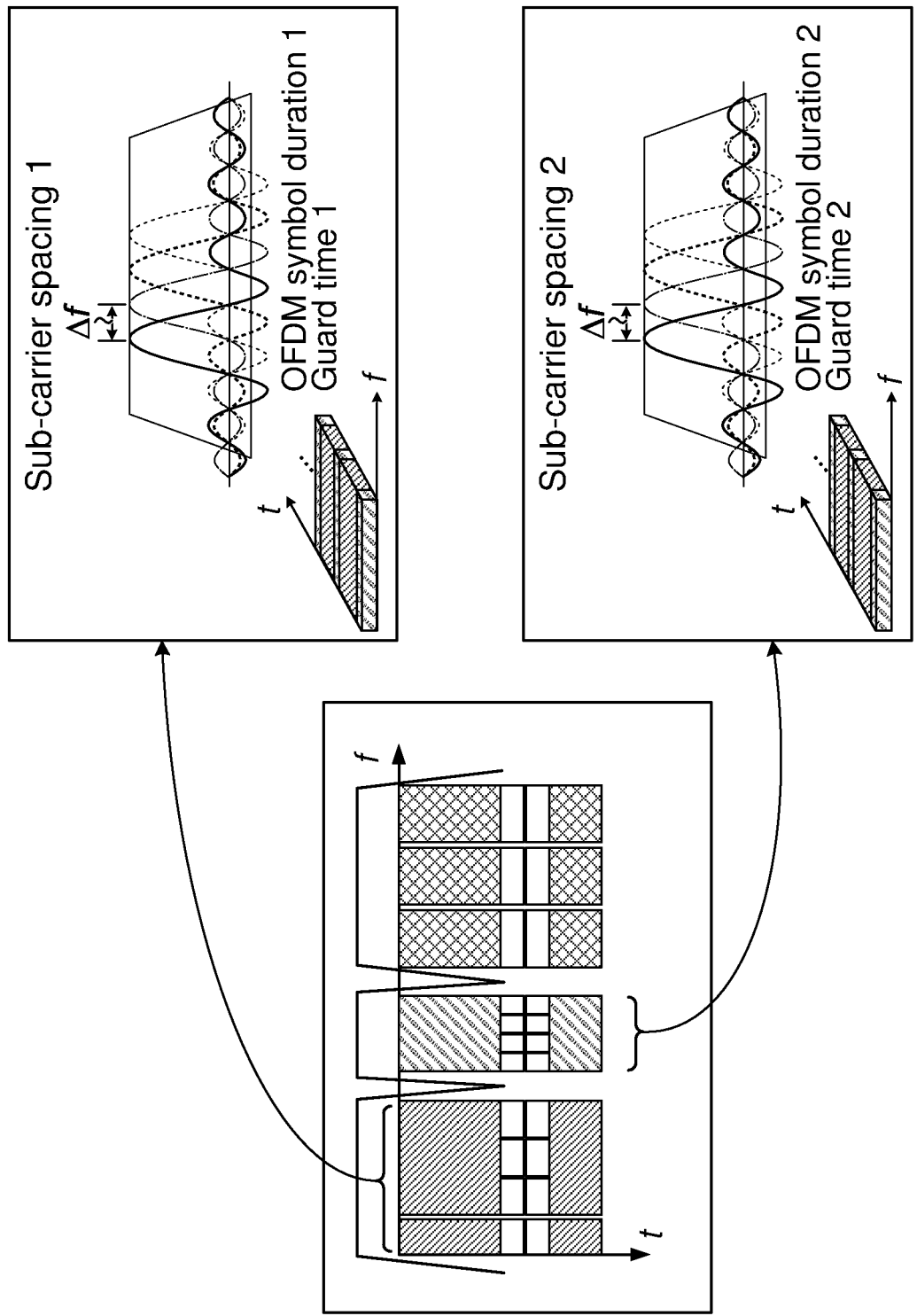
FIG. 3 shows different numerology co-existence in different waveforms with different subcarrier spacing, symbol duration, or guard time in accordance with an embodiment of the invention.

Example embodiments are described herein in which the parameters of a Filtered OFDM (F-OFDM) system may, in at least some applications, be configurable to support multiple waveforms, multiple access schemes and multiple frame structures, thereby accommodating a range of application scenarios and service requirements. By way of example, FIG. 3 illustrates an F-OFDM time-frequency signal plot illustrating the application of three sub-band filters to create OFDM subcarrier groupings with three different inter-sub-carrier spacings, OFDM symbol durations and guard periods. By enabling multiple parameter configurations, F-OFDM can, in at least some applications, allow for the optimal selection of parameters for each service group and, thus, may facilitate overall system efficiency. In some embodiments, F-OFDM is one waveform of a spectrally contained OFDM waveform, and the spectrally contained OFDM waveform could be a Time Windowing (TW) OFDM waveform.

In example embodiments, the OFDM numerology with scalable features are designed with TTIs that are linearly and inversely scaled with subcarrier spacing options to maintain a limited set of sampling frequencies for different FFT sizes. In some applications, such a configuration may reduce the complexity of the network interface used in communications equipment—for example, chipset implementation complexity in receiving devices may be reduced. In some example embodiments, optimized CP and TTI schemes are provided to achieve one-for-all applications for each subcarrier spacing option.

Before proceeding, some terminology definitions are provided. A set of time/frequency resources may be partitioned into different time intervals, such as subframes, transmission time units (TTU), scheduling intervals, etc. In embodiments, a subframe is the same as a TTI. A subframe may have multiple TTUs, or exactly one TTU, depending upon the embodiment. In some embodiments, a TTU may even be longer than a subframe. A scheduling interval typically includes at least one TTU, and a scheduling interval may have a duration in time that is equal to, longer than, or shorter than a subframe. "DL" refers to one or more downlink OFDM symbols having a particular subcarrier spacing, "UL" refers to one or more uplink OFDM symbols having the same subcarrier spacing, and "GP" refers to a guard period between uplink and downlink.

In an example embodiment, the communications system permits a plurality of subcarrier spacing (SS) choices ($SS_1$, $SS_2$, $SS_3$, ..., $SS_N$, where N≥2), CP durations ($cp_1$, $cp_2$, $cp_3$, ..., $cp_N$) and transmission time intervals ($TTI_1$, $TTI_2$, $TTI_3$, ..., $TTI_N$) to be configured. Useful symbol durations ($t_1$, $t_2$, $t_3$, ..., $t_N$) associated with the SS choices are the inverse of the respective subcarrier spacing values, To reduce the overall sampling frequencies used by the communications network and the user equipment devices, in an example embodiment, a numerology scheme and criteria is employed such that, for any scaling factor (in this case, integer number M):

$$\text{if } SS_i = M * SS_j, \text{ then } cp_i = \frac{cp_j}{M} \quad (1)$$

where $1 \leq i, j \leq N$, $i \neq j$ and where $TTI_i$ and $TTI_j$ each consists of one or more OFDM symbols, one OFDM symbol of which is made up of an OFDM useful part and a CP part. Each of $TTI_i$ and $TTI_j$ is scalable over $SS_i$ and $SS_j$ according to the same relationship as illustrated in equation (1) when $TTI_i$ and $TTI_j$ contain the same number of OFDM symbols. A scaling factor, M, can be any number (except for 1), including even numbers or $2^n$ values where n is an integer, based on design demand and requirements. A scaling factor of the form $2^n$ may provide for scalable numerology and could therefore be preferred. Design demands and requirements may include, for example, minimizing the impacts of mobility, phase noise and/or delay spread of the environments. For the example embodiments with backward compatibility discussed herein, consider the following guidelines, as illustrative examples of relationships or configurations that could be applied in some embodiments:

a) The set of subcarrier spacings {$SS_i$, i=1, 2, ..., N} includes a base subcarrier spacing of 15 kHz (the same as the LTE subcarrier spacing) and subcarrier spacing that are versions of the base subcarrier spacing scaled up or down to generate higher and lower subcarrier spacings, such as 30 kHz, 60 kHz and 7.5 kHz. Furthermore, this scalable numerology is based on a base sampling frequency of 30.72 MHz, the same sampling frequency as used for LTE.

b) Any $TTI_i$ for a particular $SS_i$ may be associated with one or more OFDM symbols, where the symbols may have the same or different lengths in the TTI, and where different lengths, when they occur, are due to the use of different types of cyclic prefixes (CPs), each with different CP lengths.

c) Each OFDM symbol consists of a CP part (with time length of $T_{cp}$) and one useful OFDM signal part (with time length of $T_u$), totaling a symbol period of $T_{cp}+T_u$, where, for $SS_i$ with $TTI_i$, $$T_u = \frac{1}{SS_i}$$

and $T_{cp}$ is selected such that $T_{cp}+T_u$ is divisible by a sampling time $T_s$; for example, for 15 kHz SS applied to 20 MHz bandwidth with an FFT size of 2048, the sampling frequency is 30.72 MHz ($SS_i$*FFT size) and sampling time $T_s$=1/30.72 MHz=0.0326 μs.

d) For any $SS_i$, two or more smaller $TTI_i$ components can be concatenated into a larger TTI.

e) The symbols comprising a TTI or a concatenated (larger) TTI, with different CP lengths (and, thus, symbol lengths), can be organized in different orders (or groupings, or symbol re-arrangements) to satisfy diverse requirements such as TTI or sub-frame boundary alignment and/or symbol boundary alignments in FDD and/or TDD sub-frames/TTIs over different sub-bands/numerology options (e.g., 15 kHz and 30 kHz subcarrier spacing) in the subcarrier bandwidth of the system. For example, if seven symbols (with two types of symbol lengths due to two types of CP lengths) in a TTI have 3- and 4-symbol groups, i.e., three s1 symbols and four s2 symbols, all the different combinations of the symbols in the TTI are valid to construct the TTI. Examples include s1s1s1s2s2s2s2, s2s2s2s2s1s1s1, s2s2s1s1s1s2s2, etc. For a concatenated TTI comprising two or more TTIs, all the component symbols in the concatenated TTI can have different order combinations across the concatenated TTI. For example, if two of the above TTIs are concatenated into a larger TTI which consists of 14 symbols (with six s1 symbols and eight s2 symbols), the different order combinations of the 14 symbols include:

s1s1s1s2s2s2s2s1s1s1s2s2s2s2;

s2s2s2s2s1s1s1s2s2s2s2s1s1s1;

s2s2s1s1s1s2s2s2s2s1s1s1s2s2;

s1s1s1s1s1s1s2s2s2s2s2s2s2s2;

s2s2s2s2s2s2s2s2s1s1s1s1s1s1; and s2s2s2s2s1s1s1s1s1s1s2s2s2s2; etc.

The proposed scalable characteristics on numerology design could be configured so that TDD sub-frame or TTI boundary alignment will naturally occur in terms of the smallest subcarrier spacing among the different numerology options. Moreover, an extension to TDD symbol boundary alignment is straightforward by additional symbol re-arrangement or re-organizing in TTIs or sub-frames, which was described above in e).

As an example, considering three scalable subcarrier spacing 7(1,6) options with LTE normal CP (NCP) configurations: 15 kHz, 30 kHz and 60 kHz, each with its basic TTI/sub-frame unit consisting of 1 long OFDM symbol (S0=Tcp0+Tuseful) and 6 short OFDM symbols (S1-S6, each symbol length=Tcp1+Tuseful). For TDD co-existence, the symbol boundary can be readily aligned with respect to 15 kHz numerology symbol and sub-frame structure, as shown in Table A below, where re-arranging symbol ordering in TTI(s) among different sub-band numerologies can make symbol and sub-frame boundaries perfectly aligned with respect to 15 kHz. Note that one basic TTI/sub-frame time unit of 15 kHz subcarrier spacing, e.g., consisting of 7 symbols, is equivalent to two basic time units of 30 kHz (e.g., with 14 symbols) and four basic time units of 60 kHz (e.g., with 28 symbols), all being 0.5 ms. The sub-frame boundary alignment is therefore in terms of the smallest subcarrier spacing numerology.

Moreover, the long symbol location(s) for different numerology options in Table A can be re-arranged and put in a different location within a sub-frame; e.g., the first symbol location, any middle symbol location or the last symbol location based on demand, while symbol boundary alignment can still be maintained. In another example, for subcarrier spacing configurations of 7.5 kHz, 15 kHz and 30 kHz (or more), the symbol and sub-frame boundary alignments can be made in the same way, by re-arranging symbols within sub-frames, where the boundary timings are in terms of 7.5 kHz subcarrier spacing numerology in this group, and one basic TTI/sub-frame time unit of 7.5 kHz subcarrier spacing, e.g., consisting of 7 symbols, is equivalent to two basic time units of 15 kHz (e.g., with 14 symbols) and four basic time units of 30 kHz (e.g., with 28 symbols), all being 1 ms.

In another embodiment, the scalable numerology 7(1,6) options can be generated in an another way to make symbol boundaries aligned. Based on the smallest and base subcarrier spacing numerology with LTE normal CP (NCP) configuration with one symbol with a long CP and six symbols with 6 short CPs, a fixed gap duration is defined as the difference of the two CP lengths; then any new numerology is generated and scaled (inversely) with the subcarrier spacing values in the sub-frame portion except for the fixed gap duration, for useful symbols and short CPs (including the first symbol with the long CP where to break into one short CP+the fixed gap duration). For example, in Table A, the symbol alignment is based on 15 kHz numerology. If we define a fixed gap duration for 15 kHz, g=Tcp0−Tcp1, then its first symbol S0=S1+g, where the duration g is not scaled when generating other numerology options but the other sub-frame portion (except for g duration) is scalable. As a result, the symbol (and sub-frame) boundary alignment can be readily achieved in a way as shown in Table B below, where each (scalable) numerology has a common fixed (or un-scaled) duration (g) that will be used as additional CP for the first symbol. Moreover, the location of the fixed gap duration, can be moving around and put in front of any symbol of (e.g., 15 kHz) numerology, such as the symbol S6 to increase this symbol CP length by g.

TABLE B

Another scalable numerology scheme and symbol/sub-frame boundary alignments

| 15k Hz | g | | | S1 | | | | S1 | | | | S2 | | | | S3 | | | | S4 | | | | S5 | | | | S6 | | | |
|---|---|---|---|---|---|---|---|---|---|---|---|---|---|---|---|---|---|---|---|---|---|---|---|---|---|---|---|---|---|---|
| 30k Hz | g | S1 | | S1 | | S1 | | S1 | | S2 | | S2 | | S3 | | S3 | | S4 | | S4 | | S5 | | S5 | | S6 | | S6 | | | |
| 60k Hz | g | S1 | S1 | S1 | S1 | S1 | S1 | S1 | S1 | S2 | S2 | S2 | S2 | S3 | S3 | S3 | S3 | S4 | S4 | S4 | S4 | S5 | S5 | S5 | S5 | S6 | S6 | S6 | S6 | | |

Table C below shows five sets of OFDM numerology options, with each set defining the following parameters: subcarrier spacing, useful symbol duration (T_u) for each symbol, CP length, # of symbols and TTI. In the example set out in the following Table C, options are associated with subcarrier spacings of 3.75 kHz, 7.5 kHz, 15 kHz, 30 kHz and 60 kHz. Notably, with 15 kHz as a base subcarrier spacing, 30 kHz is representative of an integer-scaled relationship (multiplication) with the integer M being 2 and 60 kHz is representative of an integer-scaled relationship (multiplication) with the integer M being 4. Additionally, 7.5 kHz is representative of an inverse integer-scaled relationship (division) with the integer being 2, and 3.75 kHz inversely with integer being 4.

In the example set out in Table C, the subcarrier spacings of 3.75 kHz, 7.5 kHz, 15 kHz, 30 kHz and 60 kHz have TTIs of 2 ms, 1 ms, 0.5 ms, 0.250 ms and 0.125 ms, respectively. The number of OFDM symbols for each TTI is set to seven for all five subcarrier spacing options. The notation of 7(1,6) may be interpreted to convey that, for the seven OFDM symbols, there is one symbol of a first type (Type 1) and six symbols of a second type (Type 2). In other words, the OFDM symbols within a parameter set can have more than one type of symbols co-existing in different sub-bands.

TABLE A

Symbol re-arrangement and boundary alignment for scalable numerology options

| 15k Hz | | | | S0 | | | | S1 | | | | S2 | | | | S3 | | | | S4 | | | | S5 | | | | S6 | | | |
|---|---|---|---|---|---|---|---|---|---|---|---|---|---|---|---|---|---|---|---|---|---|---|---|---|---|---|---|---|---|---|---|
| 30k Hz | | S0 | | S0 | | S1 | | S1 | | S2 | | S2 | | S3 | | S3 | | S4 | | S4 | | S5 | | S5 | | S6 | | S6 | | | |
| 60k Hz | S0 | S0 | S0 | S0 | S1 | S1 | S1 | S1 | S2 | S2 | S2 | S2 | S3 | S3 | S3 | S3 | S4 | S4 | S4 | S4 | S5 | S5 | S5 | S5 | S6 | S6 | S6 | S6 | | | |

In the example set out in Table 1, the symbol types are distinguished by distinct CP length. For a subcarrier spacing of 7.5 kHz, for example, one of the seven symbols is a Type 1 symbol having a 10.42 μs CP and six of the symbols are Type 2 symbols having a 9.38 μs CP. Moreover, it should be clear that CP lengths contained in the corresponding OFDM symbols are also scalable for different subcarrier spacing options.

As can be seen from Table C, for one type of numerology signal, subcarrier spacing and OFDM useful part have scaled relationships with the subcarrier spacing and OFDM useful part in other types of numerology signal. For example, in the numerology parameter set associated with subcarrier spacing 3.75 kHz, useful symbol duration ($T\_u$) for each symbol is double the useful symbol duration ($T\_u$) defined for subcarrier spacing 7.5 KHz. CP length and OFDM symbol in one type of numerology signal have scaled relationships with the CP length and OFDM symbol in other types of numerology signal while keeping the same CP overhead. For example, in the numerology parameter set associated with subcarrier spacing 3.75 KHz, the Type 1 CP/OFDM symbol and Type 2 CP/OFDM symbol lengths are double the respective Type 1 CP/OFDM symbol and Type 2 CP/OFDM symbol lengths defined for subcarrier spacing 7.5 KHz, such that the CP overhead for each parameter set is the same at 6.7%. Accordingly, TTI length has a scaled relationship with the TTI length in other types of numerology signal sets while keep the same number of symbols per TTI. In further, some parameters have a proportional scaled relationship between different sets with other parameters. Some parameters have reciprocal proportional scaled relationship between different sets with other parameters.

TABLE C

First example numerology

| Subcarrier spacing (KHz) | 3.75 | 7.5 | 15 | 30 | 60 |
|---|---|---|---|---|---|
| Useful duration T_u (us) | 266.67 | 133.33 | 66.67 | 33.33 | 16.67 |
| CP length (us) | 20.84, 18.76 | 10.42, 9.38 | 5.2, 4.7 | 2.60, 2.34 | 1.30, 1.17 |
| # of symbols per TTI | 7(1, 6) | 7(1, 6) | 7(1, 6) | 7(1, 6) | 7(1, 6) |
| TTI (ms) | 2 | 1 | 0.5 | 0.250 | 0.125 |
| CP overhead | 6.7% | 6.7% | 6.7% | 6.7% | 6.7% |
| (1) Type 1 CP period (us) | 20.83 | 10.42 | 5.21 | 2.60 | 1.30 |
| (2) Type 2 CP period (us) | 18.75 | 9.38 | 4.69 | 2.34 | 1.17 |
| (3) OFDM useful part period (us) | 266.67 | 133.33 | 66.67 | 33.33 | 16.67 |
| Type 1 OFDM symbol (us): (1) + (3) | 287.50 | 143.75 | 71.88 | 35.94 | 17.97 |
| Type 2 OFDM symbol (us): (2) + (3) | 285.42 | 142.71 | 71.35 | 35.68 | 17.84 |

The numerology of the example set out in the above Table C (implemented through CP design as an illustrative example) may be considered to have been optimized for low CP overhead. One scalable set of numerology is applicable to the scalable FFT sizes and carrier bandwidths. Details for the two types of symbols used in each subcarrier spacing option are given in the following Table D, where both Type-1 CP lengths and Type-2 CP lengths are scalable over the subcarrier spacing options.

TABLE D

Detail for first example numerology of Table 1

| Subcarrier spacing (kHz) | 3.75 | 7.5 | 15 | 30 | 60 |
|---|---|---|---|---|---|
| FFT sizes | 8192 | 4096 | 2048 | 1024 | 512 |
| Sampling frequency (MHz) | 30.72 | 30.72 | 30.72 | 30.72 | 30.72 |
| Time sampling interval $T_s$ (μs) | 0.0326 | 0.0326 | 0.0326 | 0.0326 | 0.0326 |
| Type 1 CP: # of time samples | 640 | 320 | 160 | 80 | 40 |
| Type 2 CP: # of time samples | 576 | 288 | 144 | 72 | 36 |
| OFDM useful part: # samples | 8192 | 4096 | 2048 | 1024 | 512 |
| FFT sizes | 4096 | 2048 | 1024 | 512 | 256 |
| Sampling frequency (MHz) | 15.36 | 15.36 | 15.36 | 15.36 | 15.36 |
| Time sampling interval $T_s$ (μs) | 0.0651 | 0.0651 | 0.0651 | 0.0651 | 0.0651 |
| Type 1 CP: # of time samples | 320 | 160 | 80 | 40 | 20 |
| Type 2 CP: # of time samples | 288 | 144 | 72 | 36 | 18 |
| OFDM useful part: # samples | 4096 | 2048 | 1024 | 512 | 256 |
| FFT sizes | 2048 | 1024 | 512 | 256 | 128 |
| Sampling frequency (MHz) | 7.68 | 7.68 | 7.68 | 7.68 | 7.68 |
| Time sampling interval $T_s$ (μs) | 0.1302 | 0.1302 | 0.1302 | 0.1302 | 0.1302 |
| Type 1 CP: # of time samples | 160 | 80 | 40 | 20 | 10 |
| Type 2 CP: # of time samples | 144 | 72 | 36 | 18 | 9 |
| OFDM useful part: # samples | 2048 | 1024 | 512 | 256 | 128 |
| FFT sizes | 1024 | 512 | 256 | 128 | |

TABLE D-continued

Detail for first example numerology of Table 1

| Subcarrier spacing (kHz) | 3.75 | 7.5 | 15 | 30 | 60 |
|---|---|---|---|---|---|
| Sampling frequency (MHz) | 3.84 | 3.84 | 3.84 | 3.84 | |
| Time sampling interval $T_s$ (μs) | 0.2604 | 0.2604 | 0.2604 | 0.2604 | |
| Type 1 CP: # of time samples | 80 | 40 | 20 | 10 | |
| Type 2 CP: # of time samples | 72 | 36 | 18 | 9 | |
| OFDM useful part: # samples | 1024 | 512 | 256 | 128 | |

In example embodiments of the present application, the described schemes can be applied to "one-for-all applications," in which one numerology for each subcarrier spacing (SS) can be applied to all feasible combinations of different scalable bandwidths and FFT sizes, as shown in Table D. Notably, in the above Table D, the highest sampling frequency has been limited to 30.72 MHz to illustrate an example of backward compatibility to LTE. It should be understood that it is not necessary to limit the highest sampling frequency when no backward compatibility is required. Higher or lower sampling frequencies (relative to LTE sampling frequencies) can be employed, in future wireless networks for example.

As noted above, the scaling factor, M, can be any number (except for 1), including even numbers or $2^n$ values where n is an integer, based on design demand and requirements. In some examples, a scaling factor of $M=2^n$ is applied, with 15 kHz subcarrier spacing used as a as baseline, where n is an integer. Based on a 15 kHz base, a $2^{11}$ scaling relationship, can provide subcarrier spacing options of: (going up) 30, 60, 120 kHz . . . , and (going down) 7.5, 3.75 kHz, . . . .

The following two Tables E and F illustrate two more example sets of options for the cases of seven symbols per TTI. In particular, Table E provides a scalable OFDM numerology with a symbol composition per TTI of 7(2,5) and, in Table F, combinations of FFT sizes and bandwidths for the numerology of Table E are presented.

TABLE E

Second example numerology

| Subcarrier spacing (kHz) | 7.5 | 15 | 30 | 60 |
|---|---|---|---|---|
| Useful duration $T_u$ (μs) | 133.33 | 66.67 | 33.33 | 16.67 |
| CP length (μs) (2) | 7.29 | 3.65 | 1.82 | 0.91 |
| CP length (μs) (5) | 10.42 | 5.21 | 2.60 | 1.30 |
| # of symbols per TTI | 7(2, 5) | 7(2, 5) | 7(2, 5) | 7(2, 5) |
| TTI (ms) | 1 | 0.5 | 0.250 | 0.125 |
| CP overhead (%) | 6.67 | 6.67 | 6.67 | 6.67 |
| (1) Type 1 CP period (μs) | 7.2917 | 3.6458 | 1.8229 | 0.9115 |
| (2) Type 2 CP period (μs) | 10.4167 | 5.2083 | 2.6042 | 1.3021 |
| (3) OFDM useful part period (μs) | 133.3333 | 66.6667 | 33.3333 | 16.6667 |
| Type 1 OFDM symbol (μs): (1) + (3) | 140.6250 | 70.3125 | 35.1563 | 17.5781 |
| Type 2 OFDM symbol (μs): (2) + (3) | 143.7500 | 71.8750 | 35.9375 | 17.9688 |

TABLE F

Detail for second example numerology of Table E

| Subcarrier spacing (kHz) | 7.5 | 15 | 30 | 60 |
|---|---|---|---|---|
| FFT sizes | 4096 | 2048 | 1024 | 512 |
| Sampling frequency (MHz) | 30.72 | 30.72 | 30.72 | 30.72 |
| Time sampling interval $T_s$ (μs) | 0.0326 | 0.0326 | 0.0326 | 0.0326 |
| Type 1 CP: # of time samples | 224 | 112 | 56 | 28 |
| Type 2 CP: # of time samples | 320 | 160 | 80 | 40 |
| OFDM useful part: # samples | 4096 | 2048 | 1024 | 512 |
| FFT sizes | 2048 | 1024 | 512 | 256 |
| Sampling frequency (MHz) | 15.36 | 15.36 | 15.36 | 15.36 |
| Time sampling interval Ts (μs) | 0.0651 | 0.0651 | 0.0651 | 0.0651 |
| Type 1 CP: # of time samples | 112 | 56 | 28 | 14 |
| Type 2 CP: # of time samples | 160 | 80 | 40 | 20 |
| OFDM useful part: # samples | 2048 | 1024 | 512 | 256 |
| FFT sizes | 1024 | 512 | 256 | 128 |
| Sampling frequency (MHz) | 7.68 | 7.68 | 7.68 | 7.68 |
| Time sampling interval $T_s$ (μs) | 0.1302 | 0.1302 | 0.1302 | 0.1302 |
| Type 1 CP: # of time samples | 56 | 28 | 14 | 7 |
| Type 2 CP: # of time samples | 80 | 40 | 20 | 10 |
| OFDM useful part: # samples | 1024 | 512 | 256 | 128 |
| FFT sizes | 512 | 256 | 128 | |
| Sampling frequency (MHz) | 3.84 | 3.84 | 3.84 | |

TABLE F-continued

Detail for second example numerology of Table E

| Subcarrier spacing (kHz) | 7.5 | 15 | 30 | 60 |
| --- | --- | --- | --- | --- |
| Time sampling interval Ts (μs) | 0.2604 | 0.2604 | 0.2604 | |
| Type 1 CP: # of time samples | 28 | 14 | 7 | |
| Type 2 CP: # of time samples | 40 | 20 | 10 | |
| OFDM useful part: # samples | 512 | 256 | 128 | |

Figure 4:
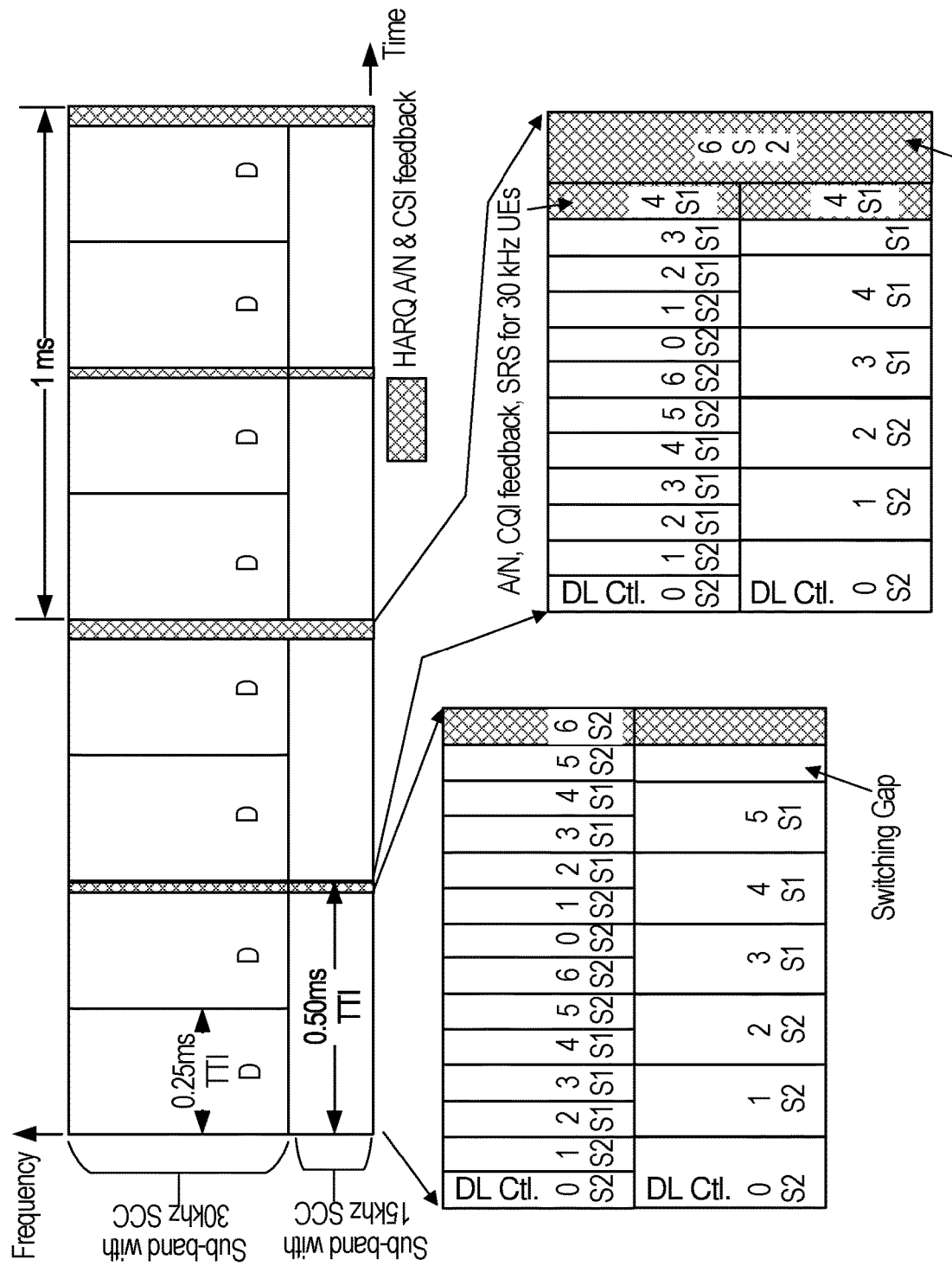
FIG. 4 shows an example DL channel with different sub-bands split into symbols with different numerologies.

In some examples, TTI boundary and timing alignment of different numerology schemes used in neighboring TDD sub-bands can be applied, to mitigate against downlink-uplink cross interference between the sub-bands for example. In this regard, FIG. 4 provides an example where TTI boundary and timing alignment is achieved by re-ordering or re-arranging OFDM symbols in TTI(s). The example in FIG. 4 relates to a DL channel with different sub-bands split into symbols with different numerologies. In FIG. 4, DL-only frame structures are provided to support DL peak data rate. 15 kHz and 30 kHz subcarrier spacing options, each with 7(3,4) symbols per TTI and basic time unit, are employed, respectively, in two sub-bands of a single carrier frequency bandwidth. Symbol details for 15 kHz are: S2 (66.67+5.2)us, S1 (66.67+4.17)us; Symbol details for 30 kHz are: S2 (33.33+2.6)us, S1 (33.33+2.08)us. TTI boundary and timing alignment details between the two sub-bands are: 1) The timing alignment is with the smaller subcarrier spacing 15 kHz TTI. Note that 1 TTI of 15 kHz is equivalent to 2 TTIs of 30 kHz by re-ordering the symbols. 2) There is a switching gap for DL/UL guard period (GP) and alignment. 3) There is UL timing alignment for acknowledgement/negative acknowledgement (ACK/NACK), channel quality indicator (CQI) feedback and/or sound reference signals (SRS).

To time align 15 kHz and 30 kHz symbols, each two 30 kHz symbols will align with one 15 kHz symbol. In the sub-band of 15 kHz, if one 15 kHz symbol were to be split into two 30 kHz symbols, including a first 30 kHz symbol and a second 30 kHz symbol, then the first 30 kHz symbol and the second 30 kHz symbol in the 15 kHz sub-band would be aligned, respectively, with the two symbols in the 30 kHz sub-band in that time slot. In the 15 kHz sub-band, TDM coexistence with 30 kHz numerology can potentially save gap overhead. In this example, one 15 kHz symbol is split into two 30 kHz symbols. If only one 30-kHz symbol is used and is sufficient for the gap overhead, then the other 30 kHz symbol is available for data or control messaging, rather than using a full 15 kHz symbol.

Figure 5A:
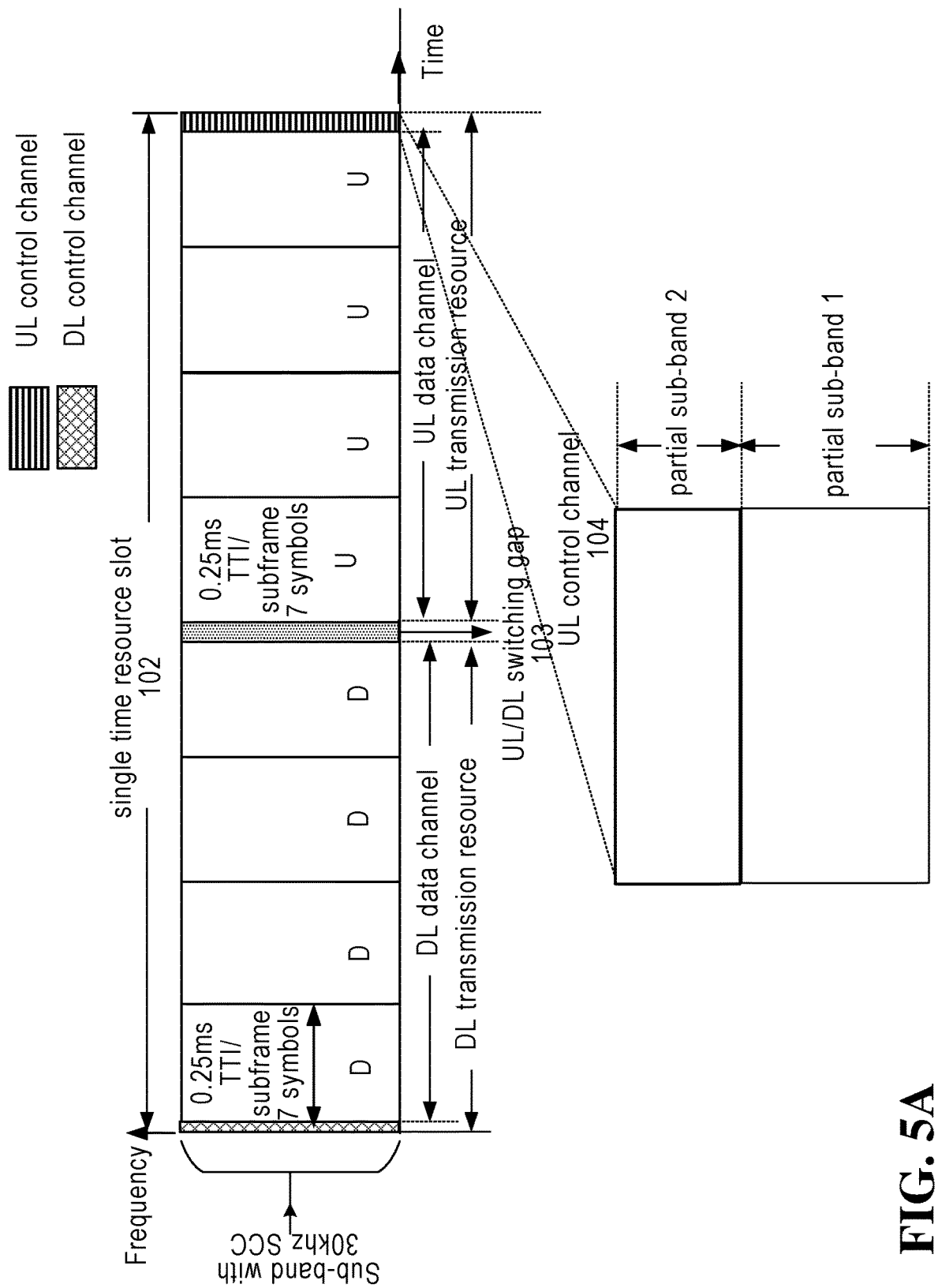
FIG. 5A shows a single time resource slot, where a UL control channel is split into sub-bands in accordance with an embodiment of the invention.

The diagrams in FIG. 5A show a single time resource slot 102, which is multiple contiguous OFDM symbols in length. In this example, a UL control channel is split into two partial sub-bands. For example, the resource slot 102 may be n×7 symbols in length when a normal cyclic prefix is used (where n is a positive integer), such as 7 or 14 symbols in length. Likewise, the resource slot 102 may be n×6 symbols in length when an extended cyclic prefix (ECP) is used, such as 6 or 12 symbols in length. The resource slot 102 includes a downlink transmission resource, an uplink transmission resource and a UL/DL switching gap. The downlink transmission resource includes a downlink control channel and a downlink data channel, and the uplink transmission resource includes an uplink control channel and an uplink data channel. As shown in FIG. 5A, the resource slot 102 has a DL/UL switching gap 103, and the resource slot may have a UL transmission opportunity (used for, e.g., hybrid auto-matic repeat request (HARM) feedback, another UL control channel, or small amounts of UL data). Further details about the resource slots may be found in "Co-existence of Low Latency and Latency Tolerant Downlink Communication", U.S. Patent Application No. 62/379,559, which was filed on Aug. 25, 2016 and which is incorporated herein by reference.

The diagrams in FIG. 5A show an embodiment of a UL control channel 104. One or more symbols in a sub-band can be split into smaller symbols in their partial sub-band based on FDM or TDM. In detail, a network entity, for example a BS, could assign partial sub-band 1 and partial sub-band 2 to different functions or types of communications, where the sub-band division can be dynamically determined based on the traffic loads, user application types and/or QoS requirements, etc. For example, based on the UL control message types and sizes of all UEs to be processed, the amount of the resources in either of the partial sub-bands could be determined. In an embodiment, the amount of the resources to be allocated to the partial sub-band 2 area could be determined and thus a division point could be determined and signalled. A division point or other information indicating a resource assignment or allocation could be signalled in DL control signalling, such as a physical downlink control channel (PDCCH)-like channel with enhanced functionality with the sub-band division indication. In detail, in an embodiment the partial sub-band 2 can be used for UL control information (UCI) or another form of uplink control, and partial sub-band 1 can be used for uplink data transmissions. Uplink data transmissions might be used in most embodiments for low-latency data, traffic, and/or resources, which may respectively be URLLC data, traffic, and/or resources, and latency-tolerant data, traffic, and/or resources, which may respectively be eMBB data, traffic, and/or resources.

In one embodiment, the partial sub-band 1 and partial sub-band 2 occupy a fixed transmission resource. In other embodiments, the partial sub-band 1 and partial sub-band 2 occupy a transmission resource that can be assigned by a base station or other component in a network, or pre-configured by a base station or other component in a network. For example, in an embodiment the partial sub-band 1 occupies a fixed transmission resource for small data traffic or packet transmission that is less than a threshold amount, if UL control transmission does not occupy the whole sub-band. The partial sub-band 1 and partial sub-band 2 could instead occupy different transmission resources, and a base station or other component in a network dynamically assigns the "occupying" transmission resource that is occupied by the partial sub-band 1 and partial sub-band 2. In an embodiment, a "zero" occupying transmission resource could be assigned for partial sub-band 1, and partial sub-band 2 occupies the whole sub-band, for control transmission for example. In one embodiment, a base station or other component in a network dynamically adjusts the occupying region for partial sub-band 1 and partial sub-band 2 based on uplink control traffic load.

The term "traffic" generally is used interchangeably with the term "data" herein, although in some instances they may be used with different scope from each other, as will be evident from the context in which the terms are used. In various embodiments of the invention, traffic may be understood as an expression of data. For example, low-latency communication traffic can be an expression of data with a relatively short transmission interval, and latency-tolerant communication traffic can be an expression of data with a relatively long transmission interval. In embodiments, data with subcarrier spacing of 15 kHz can be understood as data with relatively long transmission interval, while data with subcarrier spacing of 30 kHz/60 kHz/120 kHz can be understood as data with relatively short transmission interval. Or, data with subcarrier spacing of 30 kHz can be understood as data with relatively long transmission interval while data with subcarrier spacing of 60 kHz/120 kHz can be understood as data with relatively short transmission interval.

In one embodiment, the partial sub-band 1 and partial sub-band 2 use different numerologies, for example, the partial sub-band 1 uses numerology 1, and the partial sub-band 2 uses numerology 2. In one embodiment, different numerologies may be used for latency-tolerant and low-latency transmissions. When pre-reserved low-latency resources are not used for low-latency transmissions, they may be use for latency-tolerant transmissions. A respective numerology may be used for each type of transmission. When latency-tolerant transmission uses otherwise unused pre-reserved low-latency resources, the latency-tolerant transmission may use a numerology that is the same as the numerology used on other latency-tolerant resources, or may use a numerology in accordance with the low-latency resources.

In one embodiment, the above numerology 1 and numerology 2 are also applicable to scalable numerologies. For example, in a sub-band of 15 kHz subcarrier spacing (SCS), the partial sub-band 2 could be configured for 30 kHz SCS, while keeping the same 15 kHz SCS in the partial sub-band 1.

In further embodiments partial sub-band 2 relates to control signaling for indicating the locations and/or formats of punctured resources for multiplexing different traffic and services. In various embodiments, low-latency data, traffic, and/or resources may respectively be URLLC data, traffic, and/or resources, and the latency-tolerant data, traffic, and/or resources may respectively be eMBB data, traffic, and/or resources.

In one embodiment, one longer symbol can be split into two symbols. In such an embodiment, it could be that, for the one longer symbol, the data (shown as D below) and pilot (shown as P below) can be FDMed (frequency is in the horizontal direction):

| P | D | D | D | D | P | D | D | D | D |
|---|---|---|---|---|---|---|---|---|---| while if the longer symbol is split into two shorter symbols, the data and pilot structure could be more flexible. For example, one shorter symbol could be used for pilots and the other shorter symbol could be used for data, as discussed in more detail by way of example below.

In one embodiment, a symbol split in partial sub-band 2 configuration can apply to self-contained frames, which include DL data and UL feedback in the same transmission frame.

In some embodiments, a control channel can carry at least one of ACK/NACK, CQI, and shared messages. In some embodiments, uplink and downlink control signaling can be radio resource control (RRC), broadcast, or dynamic scheduled signaling.

Figure 5B:
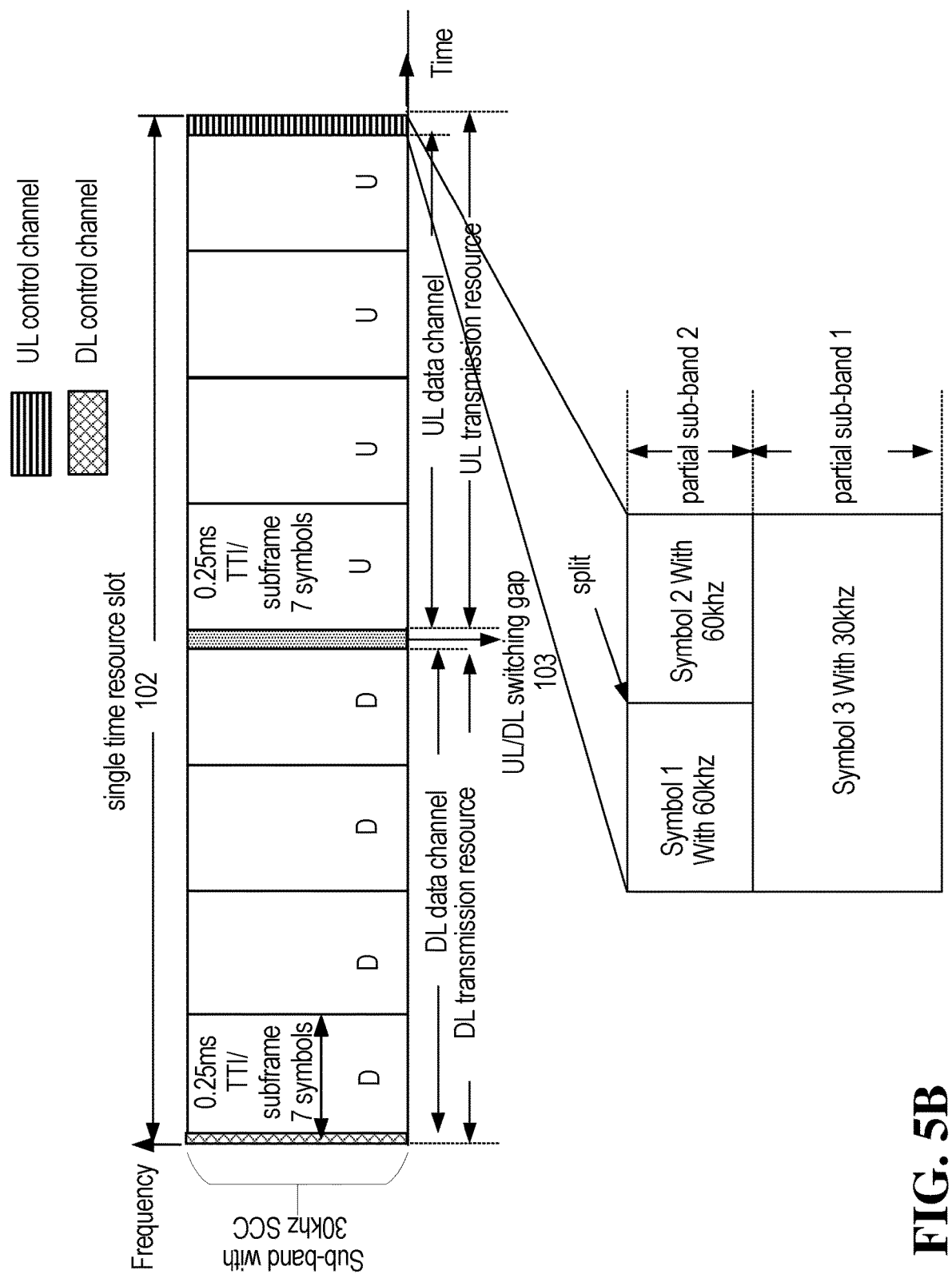
FIG. 5B shows a single time resource slot, where a UL control channel is split into sub-bands and one or more time-division multiplexing (TDM) symbols in a sub-band are split into smaller symbols with different numerologies in accordance with an embodiment of the invention.

Building on the above embodiment of FIG. 5A, FIG. 5B shows a TDM symbol split configuration in the uplink control channel in one embodiment. The difference with the above embodiment described in FIG. 5A, is that in the partial sub-band 2 of a sub-band in FIG. 5B, one longer symbol is split into two symbols (Symbol 1 and Symbol 2), or more symbols such as four symbols in another embodiment, based on scalable numerologies. For example, one 30 kHz symbol could be split into two 60 kHz symbols, or four 120 kHz symbols.

In FIG. 5B, instead of a single symbol in partial sub-band 2, partial sub-band 2 carries a first 60 kHz Symbol 1 and a second 60 kHz Symbol 2. The first 60 kHz Symbol 1 and the second 60 kHz Symbol 2 in partial sub-band 2 are aligned with symbol 3 in the 30 kHz partial sub-band 1 in that time slot. Thus the 30 kHz partial sub-band, and the TDM coexistence with 60 kHz numerology in this case will allow the 60 kHz Symbol 1 for fast processing and decoding for fast feedback, or self-contained feedback in time, for example, and the same for the 60 kHz Symbol 2. On the other hand, the 30 kHz Symbol 3 can be used for, e.g., small data transmission to communicate relatively small amounts of data, resource reservation for grant-free user data transmissions, etc.

In one embodiment, one longer symbol can be split into shorter Symbol 1 and Symbol 2. Symbol 1 and Symbol 2 can be TDM or FDM. This is discussed in further detail below, by way of example in the following option 1 and option 2.

Option 1: a shorter symbol 1 can be used for uplink control channel, and symbol 2 can be used for uplink data transmission, where the vertical direction is time and horizontal direction is frequency:

| P | P | P | P | P | P | P | P | P | P |
|---|---|---|---|---|---|---|---|---|---|
| D | D | D | D | D | D | D | D | D | D |

Option 2: a shorter symbol 1 can be used for a combination of uplink control channel and uplink data channel, and symbol 2 can be used for a combination of uplink control channel and uplink data channel:

| P | D | D | D | D | D | D | D | D | P |
|---|---|---|---|---|---|---|---|---|---|
| P | D | D | D | D | D | D | D | D | P |

In one embodiment, a base station or another component in a network configures the sub-band division. The division between the partial sub-bands could be based on UE traffic, UL control signaling size, user application type, small packet size, etc. Information regarding these partial sub-band size or division parameters or characteristics could be obtained in a gNB for example, based on current and previous scheduling information. In one embodiment, a base station or another component in the network receives messages from multiple UEs, and obtains UL control signaling size of each UL UE in this sub-frame and latency requirements of each UE, and determines both symbol splitting numerology and a division, such as a division ratio, between the two partial sub-bands.

Figure 5C:
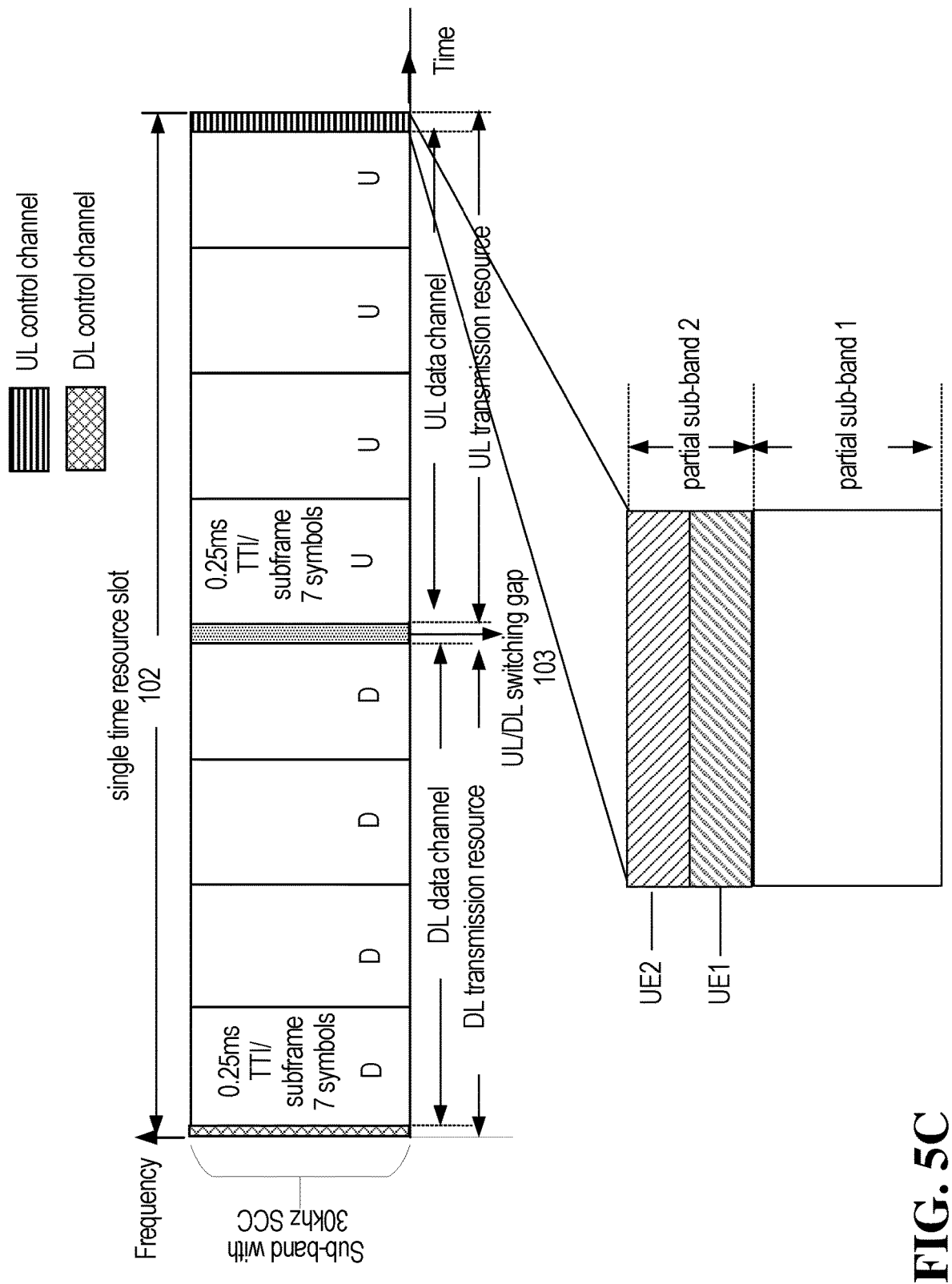
FIG. 5C shows a single time resource slot, where a UL control channel is split into sub-bands and one or more symbols in a sub-band are split into smaller symbols for different UEs in accordance with an embodiment of the invention.

FIG. 5A illustrates FDM between two partial sub-bands, and FIG. 5B illustrates TDM-based symbol splitting in one of those sub-bands. Building on the above embodiment of FIG. 5A, FIG. 5C shows an FDM symbol split configuration in the uplink control channel in one embodiment. The difference with the above embodiment described in FIG. 5A is that the partial sub-band 2 in FIG. 5B is further divided into parts that are respectively allocated for different UEs, which are shown as UE1 and UE2.

Note that the physical resources in the split symbols in FIG. 5B and the following figures, or partial sub-bands (e.g., partial sub-bands 1 and 2 in FIG. 5A), can be localized allocations of RBs or distributed allocations of RBs. One symbol control area can be shared by different UEs, for example for their UL control messages, e.g., UE1 and UE2 share part of the control area. In other embodiments, different uplink control information from different UEs can be multiplexed in FDM, TDM and/or CDM manner in 1-symbol short-PUCCH or 2-symbol PUCCH channel, where TDM can be considered as a kind of symbol splitting from a control (e.g., PUCCH) symbol based on multiple numerologies. In some embodiments in FIG. 5B, (split) Symbol 1 with 60 kHz can be used for, e.g., Reference Signal (RS) of a UE, and Symbol 2 with 60 kHz and Symbol 3 with 30 kHz can be used for other uplink control information (UCI) and/or data transmissions for the same UE, or used for UCI and/or data transmissions for different UE(s). RS and UCI can be, for example, sequence based signals. For example, multiple (e.g., orthogonal) sequences for control and/or multiple data transmissions can share any of the symbols (Symbols 1, 2, or 3) by one or more UEs, and for one UE, if the data and RS transmission are not FDM multiplexed in a same symbol, there could be a benefit for UE Peak to Average Power Ratio (PAPR) performance, thus leading to more effective UE transmissions.

Figure 5D:
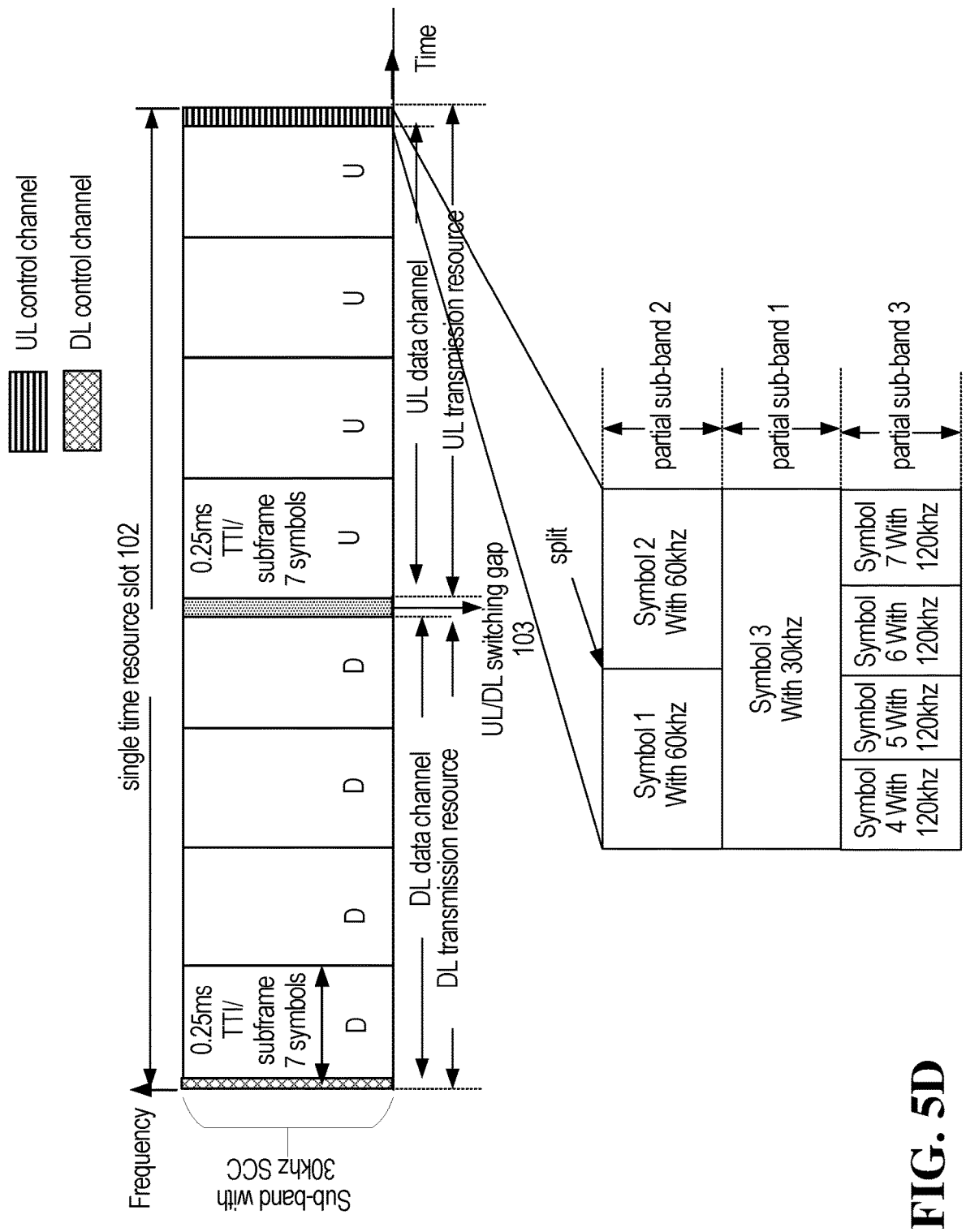
FIG. 5D shows a single time resource slot, where a UL control channel is split into sub-bands and one or more TDM symbols in a sub-band are split into smaller symbols with different numerologies in accordance with an embodiment of the invention.

The two partial sub-bands and two-way symbol splitting in FIGS. 5A and 5B are illustrative examples. According to another embodiment shown in FIG. 5D, there are more than two partial sub-bands and a symbol is split into more than two smaller symbols. In FIG. 5D, like the above embodiment described in FIG. 5B, in the partial sub-band 2 of a sub-band, one longer symbol can be split into two symbols (Symbol 1 and Symbol 2). FIG. 5D also illustrates that, in a third partial sub-band 3 of the sub-band, one longer symbol can be split into four symbols (Symbol 4, Symbol 5, Symbol 6 and Symbol 7) based on scalable numerologies. Providing an example, one 30 kHz symbol could be split into two 60 kHz symbols, or four 120 kHz symbols.

In FIG. 5D, there is a first 60 kHz Symbol 1 and a second 60 kHz Symbol 2; the first 60 kHz Symbol 1 and the second 60 kHz Symbol 2 in the 30 kHz sub-band are aligned with the Symbol 3 in the 60 kHz sub-band in that time slot. In one embodiment as shown, the first 120 kHz Symbol 4 and the second 120 kHz Symbol 5 in the 30 kHz sub-band are aligned with the Symbol 1 in the 60 kHz sub-band in that time slot, and the third 120 kHz Symbol 6 and the fourth120 kHz Symbol 7 in the 30 kHz sub-band are aligned with the Symbol 2 in the 60 kHz sub-band in that time slot. The embodiment shown in FIG. 5D also illustrates that the first 120 kHz Symbol 4, the second 120 kHz Symbol 5, the third 120 kHz Symbol 6 and the fourth120 kHz Symbol 7 in the 30 Hkz sub-band are aligned with the Symbol 3 in the 30 kHz sub-band in that time slot. Thus the 30 kHz sub-band, and the TDM coexistence with 60 kHz and 120 kHz numerology can save gap overhead, as noted above for a 15 kHz/30 kHz symbol split. Embodiments of such divisions could be beneficial in some scenarios. For example, some UEs may require fast symbol processing and feedback to previous DL data, and/or there could be more users to use these UL control resources.

In some embodiments, the splitting/multiplexing configuration in FIG. 5D, such as all or a subset of Symbols 1~7, can be used for grant-based transmissions, grant-free transmissions and/or a combination of the two to provide fast multiple scheduling request (SR) opportunities for more UEs in a given limited period on a dedicated and/or contention basis, to support URLLC traffic for example. Such a splitting/multiplexing configuration could also or instead be used for providing more UL sounding signals for more UEs in a period on a dedicated and/or contention basis to support, e.g., UL measurement and control, tracking in mobility, etc. For example, embodiments could be applicable to SR enhanced and new SR design in the sense of increasing SR opportunities per slot for fast scheduling request.

Figure 5E:
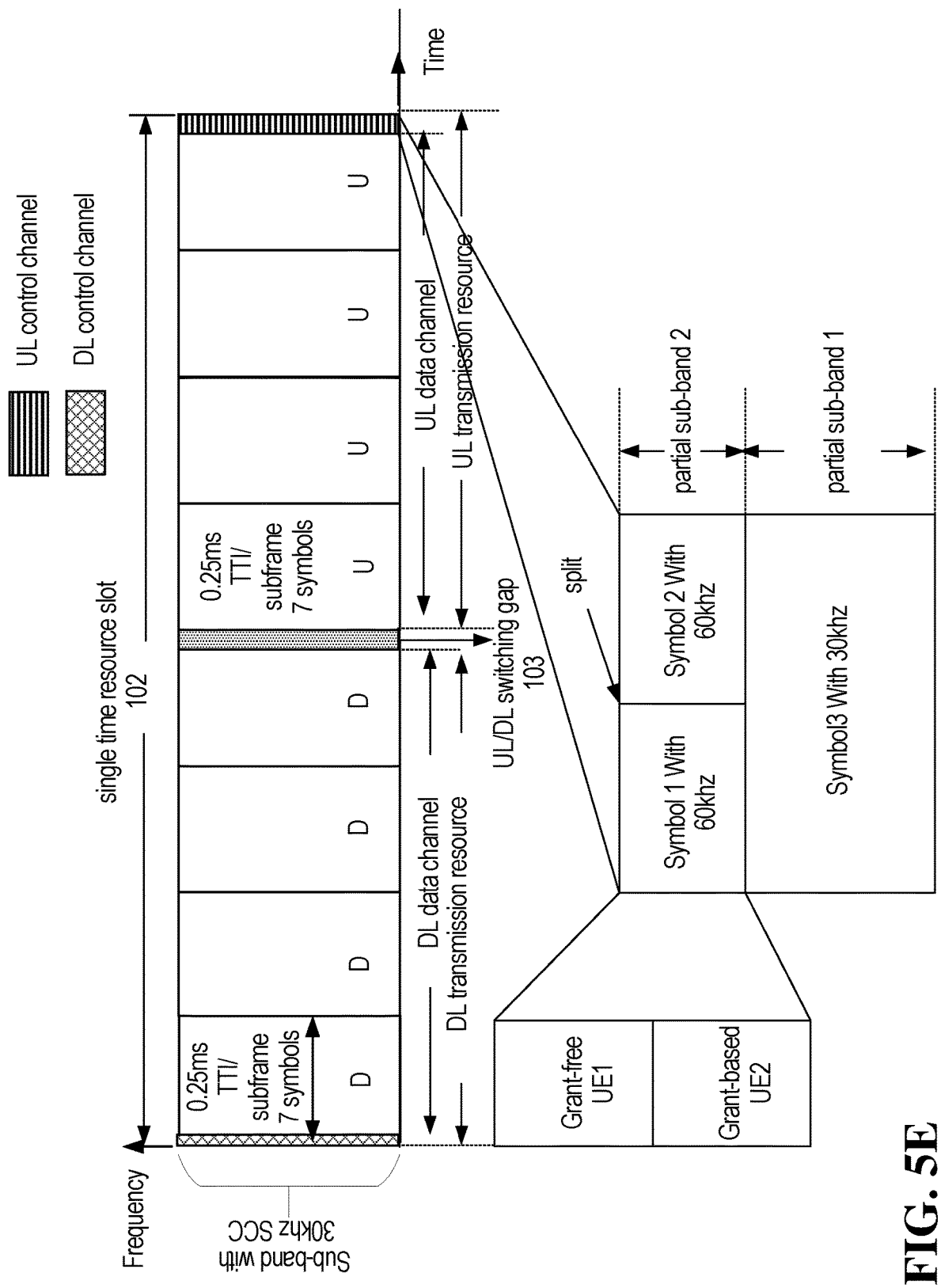
FIG. 5E shows a single time resource slot, where a UL control channel is split into sub-bands and one or more TDM symbols in a sub-band are split into smaller symbols with different numerologies, and different transmission resource assignment mechanisms are supported in one symbol in accordance with an embodiment of the invention.

Further building upon FIG. 5B, a detailed transmission resource assigned in one symbol is shown in FIG. 5E. In the embodiment shown, one symbol has multiple transmission regions, or frequency resources, e.g multiple resource blocks (RBs). The multiple transmission regions can be assigned to grant based UEs, grant free UEs, or a combination of grant based UEs and grant free UEs as shown. FIG. 5E only shows one option. In another embodiment, a transmit-receive point (TRP) or other component in a network could dynamically assign transmission resources in a symbol based on traffic requirements, for example.

In some embodiments, different uplink control information from different UEs can be multiplexed in FDM, TDM and/or CDM manner in a control (e.g., PUCCH channel), where TDM can be considered as a kind of symbol splitting from a control (e.g., PUCCH) symbol using mixed numerologies as shown in FIG. 5E. For example, (split) Symbol 1 with 60 kHz can be used for two UEs with grant-free and grant-based (control and/or data) transmissions, respectively, with FDM multiplexing. Moreover, grant-free resources can be configured such as UE1 grant-free resource region in FIG. 5E or Symbols 4~7 in FIG. 5D to be used in a contention basis for multiple UEs to transmit urgent control signaling. For example, a scheduling request from a UE with URLLC traffic to resource allocation for a data transmission is latency-constrained, while SR opportunity periodicity with dedicated resources for each UE can be too large to satisfy the latency requirement of URLLC traffic.

Other embodiments could involve multiplexing of different UE messages and/or multiple messages from a single UE within a control channel (e.g., a one-symbol or two-symbol NR PUCCH channel or a long NR PUCCH channel) due to certain design considerations, e.g., latency limitation, reliability and other QoS constraints. The messages could include control and/or data, multiple application traffic such as URLLC and/or eMBB, and/or other content. The UE messages also or instead include UE DL measurement and channel reports, UL sounding signals, scheduling requests, UE power headroom reports, ACK/NACK feedback for DL transmissions, as well as reference signals for UE activity detection, identification and/or initial transmission identification among multiple repetitions/retransmissions of a UE, etc. In some embodiments, UL control messages can share the same UL control symbol(s) in FDM, TDM and/or CDM with mixed scalable numerologies. UL data transmissions can share an entire UL control area or symbol(s) or part of a UL control area or symbol(s) (e.g., URLLC channel) in a network. In other embodiments, one larger symbol (with smaller SCS) is split two or more symbols (with larger SCS) within a sub-band (and then CDM/FDM could optionally be applied. This could provide more and flexible resources in a control (e.g., PUCCH) channel to be shared in a dedicated or contention based way by multiple UEs and/or multiple (control and/or data) messages from single UE. For example, a split symbol with larger SCS can increase more opportunities for a group of UEs to transmit their SRS or RS signals using CDM while keeping their control signals orthogonal with low PAPR.

In another embodiment, if a UE is configured to perform simultaneous control channel (e.g., PUCCH) and PUSCH transmissions in one slot (or associated aggregated slots), then the UE can take advantage of its PUSCH transmit and control (e.g, PUCCH) messages to deliver more information to a gNB using pre-defined/(pre-)configured mapping(s) from one source to the other or joint/cross reference. A PUSCH transmission can be in a UL resource region and/or a UL control region, multiplexing within a UL channel using TDM, FDM, CDM or a combination of two or more of these, with one or more numerologies. For example, if a PUSCH message has included the UE identification and/or reference signal (RS), a same-sized PUCCH channel can transmit more information, e.g., using any of multiple messages (such as sequences) for the UE to indicate multiple information. If a PUCCH channel of a UE has considered the design with an RS, the RS can be saved in PUSCH messages and more data can be included in the messages if the PUCCH RS can be appropriately applied to the PUSCH (e.g., in terms of frequency domain channel characteristics). If a PUCCH transmission includes an RS to be able to uniquely identify a UE, the PUSCH message may not need to include a UE ID. These features could not be achieved if PUSCH messages and PUCCH transmissions of a UE are totally independent, without this type of association. Note that associated control and data transmissions of a UE, to potentially enhance transmission efficiency, can be applied to both UL and DL at least in some scenarios, depending on, e.g, UE service types, application requirements and system configurations such as TDD, FDD, MIMO/multiple beams, etc.

In some embodiments, the information for control (e.g., PUSCH) and PUCCH messages to be transmitted in one or more associated slots simultaneously can be indicated by a gNB, either semi-statically or dynamically. For multiple mapping options between a control and PUSCH messages of a UE, there are different ways to deal with these. For example, multiple mapping schemes can be pre-defined, the multiple mapping options can be (pre-)configured semi-statically for a UE, and the option that is to be used at any time can be dynamically configured by a gNB in a scheduling or grant message. Note that these mapping options can include the scenario where control (e.g, PUSCH) messages and PUCCH transmissions of a UE are totally independent without any association. For example, this option can be a default configuration.

Figure 6:
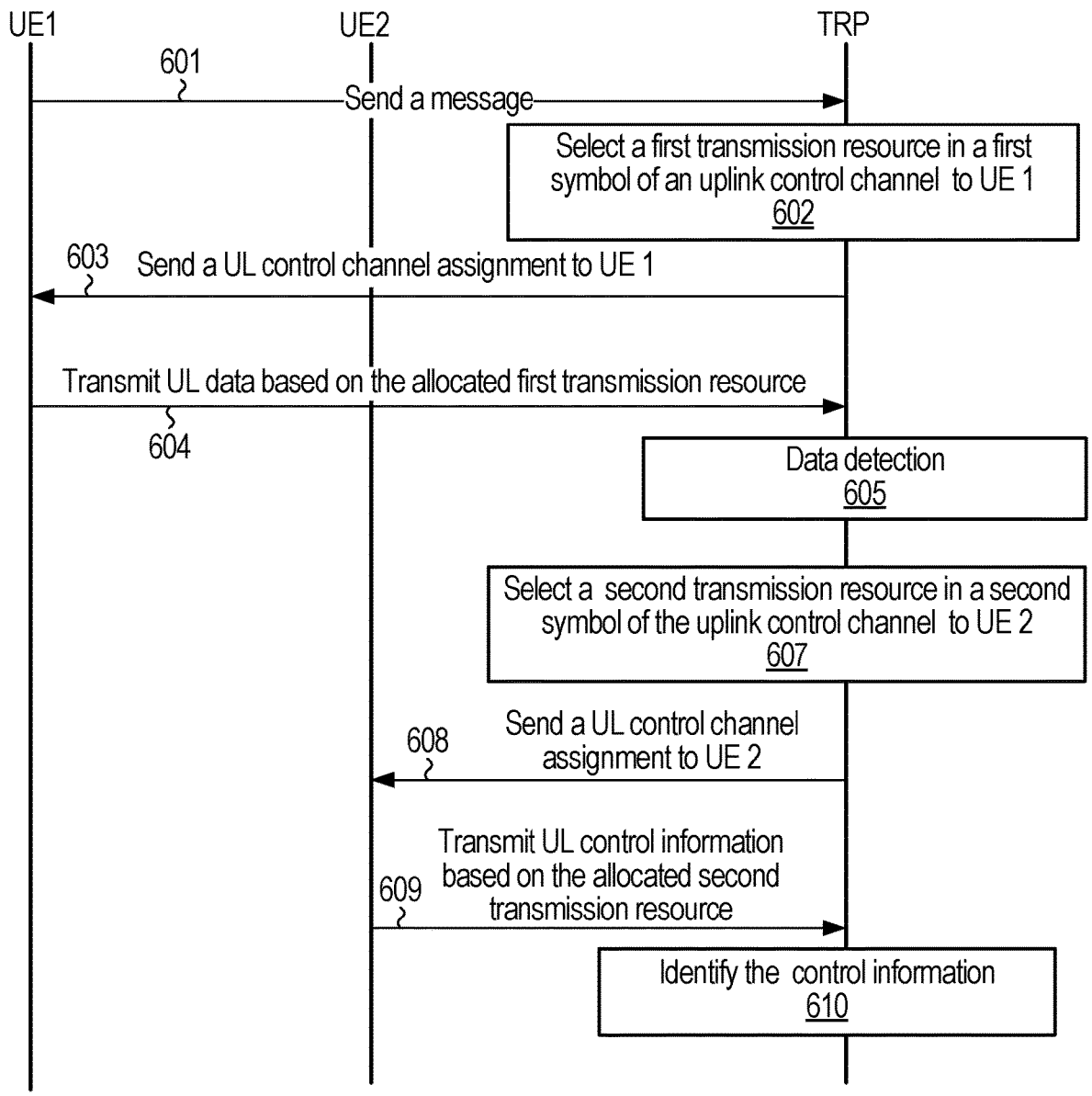
FIG. 6 shows a signaling diagram for uplink data and control information communications in accordance with an embodiment of the invention.

FIG. 6 shows a signalling diagram for uplink data and control information communications.

When a UE1 initially accesses the network or has arriving data to be transmitted, the UE1 sends a message at 601, to request a transmission resource (SR). At step 602, a TRP in this example selects a first transmission resource in a first symbol of an uplink control channel to UE1. The step 601 could be performed by a grant based UE, and in the step 602, the TRP can dynamically allocate the transmission resource for grant-based transmissions or semi-statically allocate a pre-configured transmission resource for a grant free transmission, where an SR message can be transmitted via a dedicated UL control channel, e.g., PUCCH or can be transmitted via a grant-free resource configured for grant-free transmissions. In an alternative scenario, if a grant free UE initially accesses the network, at the step 601, the grant free UE sends a normal initial access message to the TRP, and at step 602, the TRP can allocate a pre-configured first transmission resource in a first symbol of an uplink control channel to the grant free UE, or the TRP can dynamically allocate a first transmission resource in a first symbol of an uplink control channel to the grant free UE.

In the embodiment shown, at the step 602, the TRP can dynamically select the transmission resource based on at least one of the UL control signaling size of each UL UE in this sub-frame, and latency requirements. Alternatively, the TRP could select a reserved transmission resource based on at least one of the UL control signaling size of each UL UE in this sub-frame, and latency requirements. For example, the first transmission resource in a first symbol of an uplink control channel could be a resource in a structure as described herein and shown by way of example in FIGS. 5A to 5E.

In the step 603, the detailed allocation is provided to the UE by the TRP, which sends a UL control channel assignment to UE1, either dynamically or semi-statically. In step 604, the UE1 could be operating in grant free mode or grant based mode, and performs UL transmission based on the assigned transmission resource. In the step 604, the data transmission can be initial data transmission or retransmission. In other embodiments, UE1 can also transmit control messages as well on the assigned transmission resource, for example, a scheduling request, SRS, UE measurement report and/or ACK/NACK feedback.

At step 605, the TRP receives and detects the data sent by the UE1, and details about the data detection and ACK/NACK feedback are described by way of example in the following paragraphs. In general, the TRP transmits an ACK/NACK based on whether or not the detection of the data was successful in step 605. If necessary, for example if a NACK was transmitted by the TRP, the UE1 retransmits the data using the allocated transmission resource or a new allocated transmission resource.

Steps 607 to 608 are performed in a similar fashion to step 602 to 603 as described above. However, the steps 607 to 608 are performed for uplink control transmission resource assignment, not for uplink data transmission resource assignment. The uplink control transmission resource could have a resource structure as described herein and shown by way of example in FIGS. 5A to 5E.

In the steps 602 and 607, when the TRP performs selection of resources in the structure of FIGS. 5B and 5D, the TRP can dynamically or semi-statistically split symbols using different numerologies based on at least one of the UL control signaling size of each UL UE in this sub-frame, and latency requirements. In an alternative option, the TRP can select a pre-configured splitting of symbols using different numerologies based on at least one of the UL control signaling size of each UL UE in this sub-frame, and latency requirements. The TRP could also or instead dynamically adjust partial sub-bands as described above or elsewhere herein.

In step 609, the UE2 transmits UL control information based on the allocated second transmission resource. The uplink control information could be used for indicating a short message as ACK/NACK downlink transmission, CQI, and/or scheduling request upon data arrival, for example. In other embodiments, UE2 can also transmit data messages as well on the assigned transmission resource.

In the step 610, the TRP receives and identifies the control information for further operations or processing.

In a first possible scenario, one or more of the UEs each send respective data to the base station (TRP in FIG. 6) in a respective grant-free uplink transmission. The respective grant-free uplink transmissions may or may not be transmitted using the same resources. In any case, for the purposes of this scenario it is presumed that the base station successfully decodes all of the transmitted data. Therefore, ACK message(s) is/are sent from the base station. In one embodiment, a separate ACK is transmitted from the base station for each UE that sent uplink data in a grant-free uplink transmission. Each ACK is coupled with information uniquely specifying the UE to which the ACK belongs. For example, each ACK may be associated with a UE ID. As another example, if there is a one-to-one mapping between UEs and multiple access (MA) signatures, then each ACK may be associated with an index identifying the MA signature of the uplink transmission being acknowledged. Each UE knows which MA signature it used to send its transmission, and so each UE will know from the indication of the MA signature which ACK is for the UE. If there is one-to-one mapping between UEs and MA signatures, then a UE ID may not even be needed. In some embodiments, the base station may transmit the ACK(s) on a dedicated downlink acknowledgement channel (e.g. a physical HARQ indicator channel (PHICH)). There may be a one-to-one mapping between the fields of the downlink acknowledgement channel and the uplink grant-free resources. A field of the downlink acknowledgement channel may be a time-frequency location of the downlink acknowledgement channel and/or a sequence used in the downlink acknowledgement channel. For example, the sequences used in the downlink acknowledgement channel may be four orthogonal codes, which can be mapped to four different MA signatures. For example, if UE used time-frequency location A to send its grant-free uplink transmission, then the ACK for UE is sent at time-frequency location B in the downlink acknowledgement channel. As another example, if UE used time-frequency location A to send its grant-free uplink transmission, then the ACK for the UE is sent using code sequence C. In other embodiments, there may be a one-to-one mapping between the fields in the downlink acknowledgement channel and the UE ID. For example, any ACK for UE is always sent at time-frequency location D and/or using sequence E in the downlink acknowledgement channel. In other embodiments, there may be a one-to-one mapping between the fields in the downlink acknowledgement channel and the MA signature. For example, whenever MA signature p11 is used for a grant-free uplink transmission, then any ACK corresponding to that uplink transmission is always sent at time-frequency location F and/or using sequence G in the downlink acknowledgement channel.

In some embodiments, the base station may transmit an ACK without any UE information. If a UE that sent a grant-free uplink transmission subsequently sees the ACK, then the UE assumes that the data of its grant-free uplink transmission was successfully decoded.

In some embodiments, the base station may transmit a group ACK. The group ACK may comprise a single ACK payload protected by a cyclic redundancy check (CRC). The payload may include an aggregation of all UE IDs or MA signatures corresponding to uplink transmissions that have been successfully decoded and are acknowledged by the base station. Each UE that sent a grant-free uplink transmission then decodes the group ACK to see if matching UE ID or MA signatures can be found in the group ACK payload and whether its grant-free uplink transmission was acknowledged. In some embodiments, a group ACK may be associated with a temporal group ID. The group ID may be derived from the grant-free resources. For example, if a group of UEs all use uplink resources C to respectively send a grant-free uplink transmission, then that group of UEs may be associated with a group ID corresponding to uplink resources C. In some embodiments, there may be a specific 1-bit field indicating that the ACK is a group ACK, and the location of time and frequency resources of the ACK is directly linked to the grant free transmission resources and a group ID may not be necessary. In some embodiments, there may be a reserved field (e.g. time-frequency location) in the downlink for sending a group ACK. The time-frequency location of the reserved field may be determined based on the location of the uplink resources used for the grant-free uplink transmissions. For example, if a group of UEs each send their grant-free uplink transmission within time-frequency region A, then the reserved field for the group ACK may be at time-frequency location B. The group ACK may be one bit: "0" for ACK and "1" for N/A, or vice versa. The bit value corresponding to "N/A" would be sent when no ACK needs to be transmitted by the base station.

In another possible scenario, one or more of the UEs each send respective data in a respective grant-free uplink transmission, and the base station successfully performs activity detection, but all decoding of the data fails. For example, if the MA signatures are reference signals, then reference signal detection may be successfully performed, but data decoding may still fail. Reference signal detection may be successful due to the following possible reasons: (1) there may be no collision of the reference signals, and any reference signal errors due to noise in the channel and interference from other reference signals are corrected because of the more robust modulation and coding scheme (MCS) of the reference signal sequence; or (2) there may be reference signal collision, but any reference signal errors due to the collision and channel noise are corrected because of the more robust MCS of the reference signal sequence; or (3) due to the orthogonal characteristics among reference signals. Because activity detection was successful, but data decoding was unsuccessful, NACK message(s) may be sent from the base station.

In one embodiment, a separate NACK is transmitted from the base station for each uplink transmission for which data decoding failed. Each NACK may be associated with UE identifying information. For example, each NACK may be associated with an index identifying the MA signature of the uplink transmission corresponding to the NACK. If there is a one-to-one mapping between UEs and MA signatures, then a UE will be able to determine that the NACK belongs to it based on the MA signature identification coupled to the NACK. Even if there is not a one-to-one mapping between UEs and MA signatures, then any UE using a particular MA signature will retransmit its data if a NACK is received that is associated with that particular MA signature. In such a situation, unnecessary uplink retransmissions may sometimes occur, e.g. if two UEs use the same MA signature, and the data from one UE is successfully decoded by the base station, and the data from another UE is not successfully decoded. The receipt of the NACK by both UEs will cause both UEs to retransmit the data even though one of the UEs does not need to retransmit its data.

In some embodiments, the variations described earlier for ACK can also be used for transmitting a NACK. As an example, the base station may transmit the NACK(s) on a dedicated downlink acknowledgement channel, and there may be a one-to-one mapping between the fields in the downlink acknowledgement channel and the uplink resources used to send the uplink grant-free transmission. There may instead be a one-to-one mapping between the fields in the downlink acknowledgement channel and the UE ID or the MA signature used to send the uplink grant-free transmission. As another example, the base station may transmit the NACK without any UE information. If a UE that sent a grant-free uplink transmission subsequently sees the NACK, then the UE assumes that the data of its grant-free uplink transmission was not successfully decoded. As another example, the base station may transmit a group NACK. The group NACK may comprise a single NACK payload protected by a CRC. The payload may include an aggregation of all MA signatures corresponding to uplink transmissions that have been unsuccessfully decoded. The UE ID may be used instead of MA signatures if the UE ID is separate from the data. Each UE that sent a grant-free uplink transmission decodes the group NACK to see whether its grant-free uplink transmission resulted in a NACK. In some embodiments, a group NACK may be associated with a temporal group ID. The group ID may be derived from the grant-free resources. In some embodiments, there may be a specific 1-bit field indicating that the NACK is a group NACK, and a group ID may not be necessary. In some embodiments, there may be a reserved field (e.g. time-frequency location) in the downlink for sending a group NACK. The time-frequency location of the reserved field may be determined based on the location of the uplink resources used for the grant-free uplink transmissions. For example, if a group of UEs each send their grant-free uplink transmission within time-frequency region A, then the reserved field for the group NACK may be at time-frequency location B. The group NACK may be one bit: "0" for NACK and "1" for N/A, or vice versa. The bit value corresponding to "N/A" would be sent when no NACK needs to be transmitted by the base station. In another example, group NACK and group ACK may be used in the same time-frequency region A. The group NACK may be one bit: "0" for NACK and "1" for ACK, or vice versa.

In another possible scenario, one or more of the UEs each send respective data in a respective grant-free uplink transmission, the base station successfully performs activity detection, some data decoding is successful, and other data decoding fails. In one embodiment, an ACK is sent for each uplink data transmission that was successfully decoded by the base station. Each ACK is coupled with corresponding UE identifying information, e.g. the UE ID or an MA signature index identifying what MA signature was used in the uplink transmission. A NACK is also sent for each uplink data transmission that was unsuccessfully decoded by the base station 100. Each NACK may be coupled with corresponding UE identifying information, e.g. a MA signature index identifying what MA signature was used in the uplink transmission. In some embodiments, a single payload, protected by a CRC, may be transmitted from the base station. The payload may include an aggregation of ACK and/or NACK information for different uplink transmissions.

In some embodiments, each ACK or NACK may be associated with an index identifying the MA signature of the uplink transmission corresponding to the ACK or NACK. If there is not a one-to-one mapping between UEs and MA signatures, then (as mentioned earlier) when a NACK is sent an unnecessary uplink retransmission may sometimes occur. Similarly, there may be situations in which a UE's data is not successfully decoded by the base station, but the UE does not send a retransmission of the data, e.g. if two UEs use the same MA signature, and the data from one UE is successfully decoded by the base station, and the data from another UE is not successfully decoded. An ACK may be sent that identifies the MA signature. The receipt of the ACK by both UEs will cause both UEs to consider their data transmission to have been successfully decoded, even though one of the UEs should instead retransmit its data. In this situation, if the UE ID of the successfully decoded UE is identified, the BS may choose to send an ACK with UE ID instead of MA signature. The UE that is not decoded successfully may not be able to find the matching ID in the ACK field and therefore does not assume the transmission is successful. In some embodiments, if the base station receives two or more transmissions from different UEs having the same MA signature, a NACK identifying the MA signature is always sent if at least one of the transmissions is unsuccessfully decoded. In such a method, having some UEs possibly unnecessarily retransmit successfully decoded data is favoured over having some UEs not retransmit unsuccessfully decoded data. Regardless of the different scenarios discussed above, in some embodiments the base station may not send NACKs for grant-free uplink transmissions. The UEs are configured to assume a NACK in the absence of an ACK. The following benefits may be achieved. Signaling may be saved by not sending NACKs. Also, ambiguities associated with sending a NACK may be eliminated. For example, if a NACK is being sent, then the UE ID associated with the NACK may not have been decoded by the base station. Therefore, the NACK may not be linked to a specific UE, thereby causing ambiguity as to which UE the NACK belongs. There may not always be a one-to-one mapping between MA signatures and a UE, such that coupling the NACK with an MA signature index may not indicate to which UE the NACK belongs. Therefore, even with activity detection, there may be ambiguities due to the UE ID possibly not being available.

As discussed above, there may be a one-to-one mapping between UEs and MA signatures, e.g. each UE may be assigned a different reference signal. One-to-one mapping between UEs and MA signatures may be more feasible in URLLC applications compared to m-MTC applications, because in m-MTC applications there may be a very large number of UEs. In some applications, such as in some URLLC applications, the pool of possible MA signatures may be larger or equal to the pool of UEs performing grant-free uplink transmissions, thereby permitting the one-to-one mapping. Another possible benefit of one-to-one mapping not mentioned above is that having a one-to-one mapping may avoid MA signature collision. For example, if the MA signature is a reference signal, then the reference signals of different UEs may not collide (particularly if the reference signals are orthogonal), thereby increasing the probability of successful activity detection at the base station. In some embodiments in which there is a one-to-one mapping, the HARQ ACK/NACK feedback for a particular UE may be one bit that is multiplexed on a resource that is determined by the MA signature used by the UE. A bit value of "0" may indicate an ACK, and a bit value of "1" may indicate a NACK, or vice versa. For example, UE may send its initial grant-free uplink transmission using reference signal p11 in. Assuming successful activity detection, the base station knows to send the ACK or NACK using a predetermined time-frequency location corresponding to reference signal p11. The UE knows to look for the ACK or NACK at the predetermined time-frequency location because reference signal p11 was used. Therefore, there may be a reduction in NACK/ACK signaling compared to schemes in which more than one bit needs to be sent for each ACK/NACK. More generally, the ACK/NACK feedback may use a particular time-frequency location and/or a particular sequence or codebook in the downlink channel corresponding to the MA signature used to send the uplink transmission.

UE operation will now be described in more detail. In some embodiments, when the UE receives an ACK (or group ACK) with matching identifying information, then the UE assumes that the grant-free uplink transmission was successful, i.e. the data was successfully decoded by the base station. The matching identifying information may be a UE ID or the identification of a MA signature (e.g. a reference signal) corresponding to that used by the UE for the uplink transmission. In some embodiments, when the UE receives a NACK (or group NACK) with matching identifying information, such a matching MA signature index, then the UE assumes that the grant-free uplink transmission failed, but that activity detection was successful. In some embodiments, when the UE does not receive an ACK or a NACK, or when the UE receives mismatched ID info, then the UE assumes that both data detection and activity detection failed. However, in embodiments in which the base station does not send NACKs, then the UE assumes that data detection failed, but the UE does not know whether activity detection was successful.

While the above description is described with respect to combined grant-free and grant-based uplink scheduling and transmission, it should be understood that a similar procedure could be implemented for grant-free and grant-based uplink scheduling and transmission.

Figure 7:
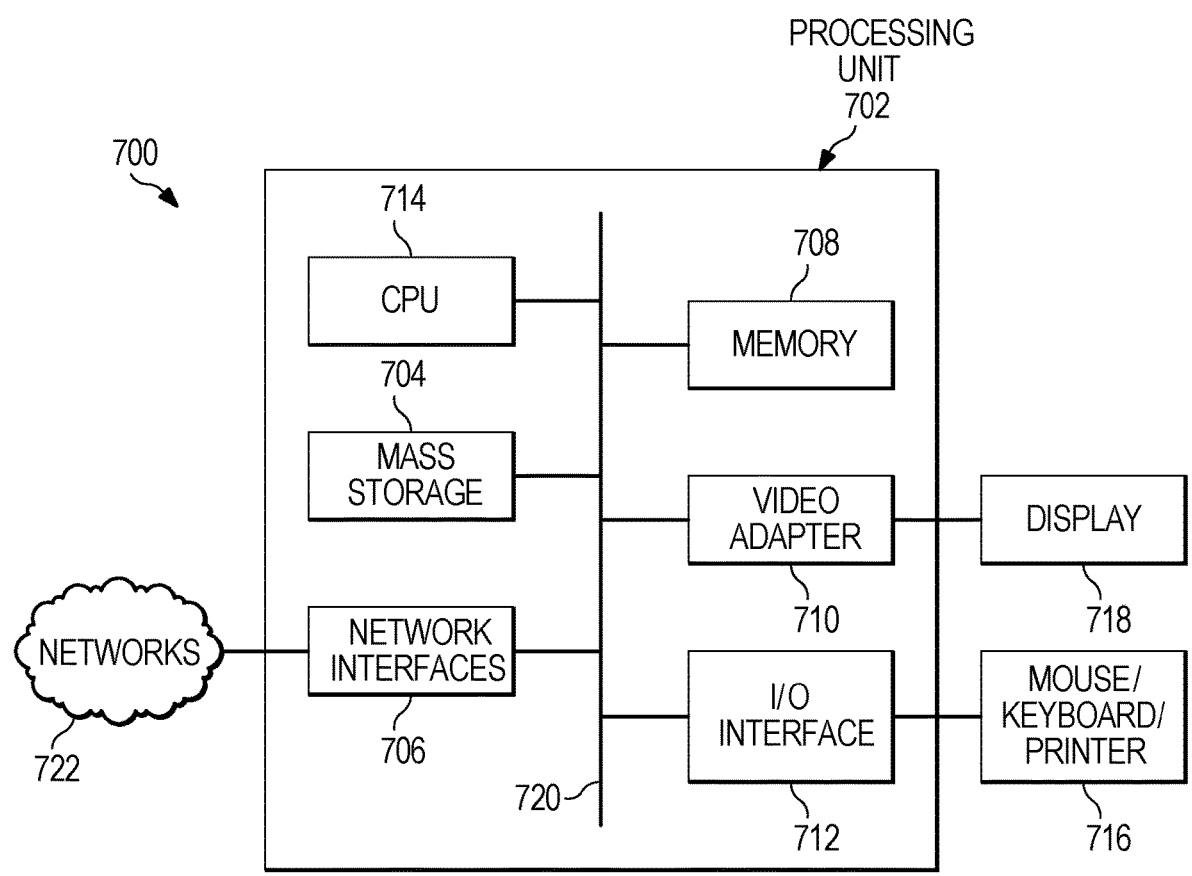
FIG. 7 is a block diagram of a network element.

FIG. 7 is a block diagram of a computing system 700 that may be used for implementing the devices and methods disclosed herein, For example, the computing system can be any entity of UE, AN,MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 700 includes a processing unit 702. The processing unit 700 includes a central processing unit (CPU) 714, memory 708, and may further include a mass storage device 704, a video adapter 710, and an I/O interface 712 connected to a bus 720.

The bus 720 may be one or more of any type of several bus architectures including a memory bus or memory controller, a peripheral bus, or a video bus. The CPU 714 may comprise any type of electronic data processor. The memory 708 may comprise any type of non-transitory system memory such as static random access memory (SRAM), dynamic random access memory (DRAM), synchronous DRAM (SDRAM), read-only memory (ROM), or a combination thereof. In an embodiment, the memory 708 may include ROM for use at boot-up, and DRAM for program and data storage for use while executing programs.

The mass storage 704 may comprise any type of non-transitory storage device configured to store data, programs, and other information and to make the data, programs, and other information accessible via the bus 720. The mass storage 704 may comprise, for example, one or more of a solid state drive, hard disk drive, a magnetic disk drive, or an optical disk drive.

The video adapter 710 and the I/O interface 712 provide interfaces to couple external input and output devices to the processing unit 702. As illustrated, examples of input and output devices include a display 718 coupled to the video adapter 710 and a mouse/keyboard/printer 716 coupled to the I/O interface 712. Other devices may be coupled to the processing unit 702, and additional or fewer interface cards may be utilized. For example, a serial interface such as Universal Serial Bus (USB) (not shown) may be used to provide an interface for an external device.

The processing unit 702 also includes one or more network interfaces 706, which may comprise wired links, such as an Ethernet cable, and/or wireless links to access nodes or different networks. The network interfaces 706 allow the processing unit 702 to communicate with remote units via the networks. For example, the network interfaces 706 may provide wireless communication via one or more transmitters/transmit antennas and one or more receivers/receive antennas. In an embodiment, the processing unit 702 is coupled to a local-area network 722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a establishing unit/module for establishing a serving cluster, a instantiating unit/module, an establishing unit/module for establishing a session link, an maintaining unit/module, other performing unit/module for performing the step of the above step. The respective units/modules may be implemented using hardware, components that execute software, or a combination thereof. For instance, one or more of the units/modules may be an integrated circuit, such as field programmable gate arrays (FPGAs) or application-specific integrated circuits (ASICs).

Embodiments disclosed herein may apply one or a combination of FDM, TDM, and scalable numerologies to resources, such as UL control symbols at the end of the a subframe, to multiplex usage among different UEs, for UL control symbols for example. Illustrative embodiments include at least the following:

FDM with partial sub-bands using the same numerology (FIG. 5A);

FDM with partial sub-bands and time aligned different scalable numerologies, where TDM-based symbol splitting is used in a partial sub-band (FIG. 5B);

FDM with partial sub-bands using the same numerology, where one partial sub-band is FDM divided for different UEs (FIG. 5C);

a combination of TDM and FDM resource partitioning with multiple scalable numerologies (FIG. 5D), for example to satisfy different UE application needs in terms of environment, latency and CP length; and FDM and TDM based resource partitions for grant-free and grant-based UEs using different numerologies (FIG. 5E).

Figure 8:
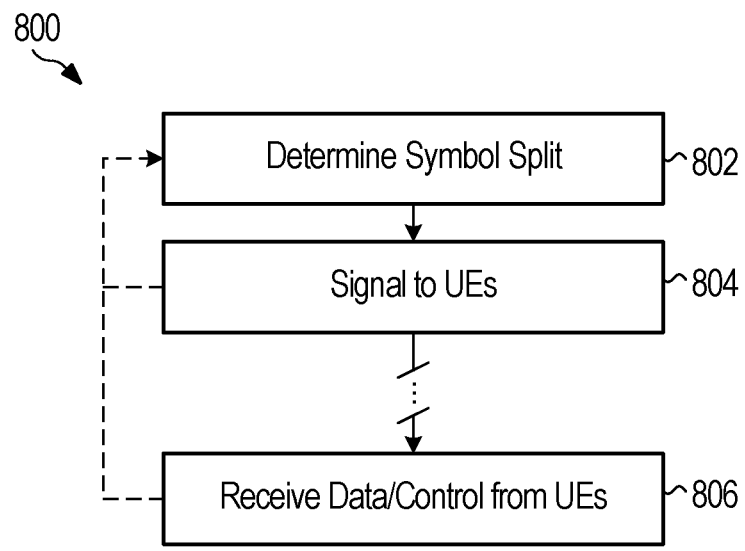
FIG. 8 is a flow diagram illustrating an example method performed by a network element.

Various aspects of the present disclosure are described in detail above. FIG. 8 is a flow diagram illustrating, more generally, an example method performed by a network element such as a base station.

The example method 800 relates to an illustrative embodiment, and includes determining a symbol split at 802. This need not necessarily involve dynamic symbol splitting every time a base station sets up communications with a UE. Dynamic symbol splitting is one embodiment, but in another embodiment symbol splitting could be pre-configured, and determined by accessing configuration information in a memory, for example. The determined symbol split, which relates to transmission resources in a symbol of a UL control channel in an embodiment, is signaled to one or more UEs at 804. Determination of symbol splitting and signaling to UEs is also shown, for example, at 602, 607 and 603, 608 in FIG. 6.

At some time after the symbol split is signaled to the UE(s) at 804, the base station receives data from a first UE and UL data or control information from a second UE, at 806. The data is received from the first UE using a first transmission resource in a first symbol of the UL control channel, and the UL data or control information is received from the second UE using a second transmission resource in a second symbol of the UL control channel, in accordance with the determined symbol split. The first symbol and the second symbol have different numerologies at a same sub-band. The first UE and the second UE could be the same UE or different UEs. In FIG. 6, the TRP receives UL data at 604 and UL control information at 609 from different UEs, shown as UE1 and UE2 in FIG. 6.

Embodiments could include additional, fewer, or different operations, performed in a similar or different order than shown. Method operations could also be performed in any of various ways as disclosed herein.

For example, the first symbol could include two or more symbols, shorter than the first symbol, and the two or more shorter symbols could have scalable numerologies associated with the first symbol. Several different examples of symbol splitting are disclosed above, with reference to FIGS. 5A to 5E, for instance.

The sub-band could be divided into at least a first partial sub-band and a second partial sub-band. A division location between the first partial sub-band and the second partial sub-band could also be adjusted. Such adjustment of a division location, and more generally adjustment of symbol splitting, is represented in FIG. 8 by the dashed lines from 804 and 806 to 802.

Division of the sub-band into partial sub-bands need not be equal or symmetric. A base station could adjust a division range of the sub-band as zero to set one of the partial sub-bands to zero, for example.

Each of the first partial sub-band and the second partial sub-band could include a first group of symbols for data transmission and a second group of symbols for control message transmission.

In some embodiments, each of the first symbol and the second symbol includes multiple transmission regions assigned for grant based UE transmission, grant free UE transmission or a combination of grant based UE transmission and grant free UE transmission. The multiple transmission regions could provide multiple scheduling request opportunities for UEs in a time period on a dedicated basis, on a contention basis, or both. The multiple transmission regions could also or instead provide UL sounding signals for UEs in a time period on a dedicated basis, on a contention basis, or both.

The data received from the first UE could include associated PUSCH transmissions. The data and/or control information received from the second UE could include associated PUSCH and/or PUCCH transmissions.

In an embodiment, the UL control channel is a 1-symbol short-PUCCH or a 2-symbol PUCCH channel.

Other possible variations of the example method 800 could be or become apparent from features disclosed elsewhere herein.

A non-transitory processor-readable medium could be used to store instructions which, when executed by one or more processors, cause the one or more processors to perform such a method. In an embodiment, the method includes receiving at a base station in a communication network, from a first UE, data using a first transmission resource in a first symbol of a UL control channel. The method also involves receiving at the base station, from a second UE, UL data or control information using a second transmission resource in a second symbol of the uplink control channel. The first symbol and the second symbol have different numerologies at a same sub-band.

A network device to perform such a method could be implemented as shown in FIG. 2B or FIG. 7 or example, with a processor such as the processing unit 250 or the CPU 714 and a non-transitory computer readable storage medium such as the memory 258, the mass storage 704, or the memory 708 storing programming for execution by the processor. The programming includes instructions to perform actions in accordance with a method, which in an embodiment involves receiving, from a first UE, data using a first transmission resource in a first symbol of a UL control channel, and receiving, from a second UE, UL data or control information using a second transmission resource in a second symbol of the uplink control channel. The first symbol and the second symbol have different numerologies at a same sub-band.

Programming for execution by a processor could include instructions to perform other operations as disclosed herein, in any of various ways consistent with the present disclosure.

Figure 9:
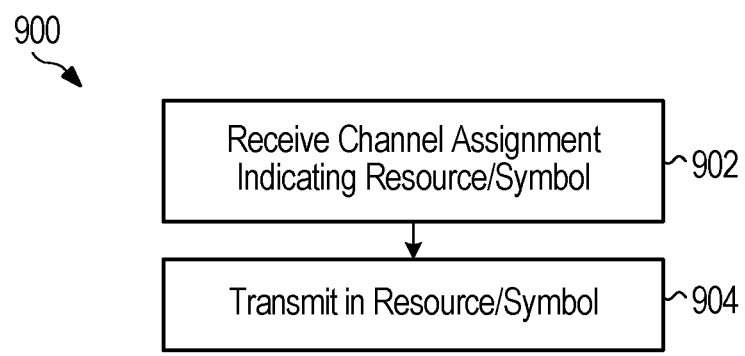
FIG. 9 is a flow diagram illustrating an example method performed by a UE.

FIG. 9 is a flow diagram illustrating an example method performed by a UE. The method 900 involves receiving at 902 a UL control channel assignment from a base station in a communication network. This is also illustrated by way of example in FIG. 6 at 603. The UL control channel assignment indicates a first transmission resource in a first symbol of the uplink control channel. The uplink control channel includes at least the first symbol and a second symbol, and the first symbol and the second symbol have different numerologies at a same sub-band. The method also involves transmitting, at 904, data or a combination of data and control information using the first transmission resource in the first symbol of the uplink control channel to the base station. In FIG. 6, this is shown at 604.

As noted above for the example method in FIG. 8, embodiments could include additional, fewer, or different operations, performed in a similar or different order than shown in FIG. 9. Method operations could also be performed in any of various ways as disclosed herein.

For example, the first symbol could include two or more symbols, shorter than the first symbol, that have scalable numerologies associated with the first symbol.

Each of the first symbol and the second symbol could include multiple transmission regions assigned for grant based UE transmission, grant free UE transmission or a combination of grant based UE transmission and grant free UE transmission. The multiple transmission regions could provide multiple scheduling request opportunities for UEs in a time period on a dedicated basis, on a contention basis, or both. The multiple transmission regions could also or instead provide UL sounding signals for UEs in a time period on a dedicated basis, on a contention basis, or both.

The sub-band could be divided into at least a first partial sub-band and a second partial sub-band. Each of the first partial sub-band and the second partial sub-band could include a first group of symbols for data transmission and a second group of symbols for control message transmission.

The UL control channel could be, for example, a 1-symbol short-PUCCH or a 2-symbol PUCCH channel.

The data includes associated PUSCH transmissions and the combination of data and control information include associated PUSCH and PUCCH transmissions in some embodiments.

Other possible variations of the example method 900 could be or become apparent from features disclosed elsewhere herein.

A non-transitory processor-readable medium could be used to store instructions which, when executed by one or more processors, cause the one or more processors to perform such a UE method as shown in FIG. 9 and/or disclosed elsewhere herein.

A UE to perform such a method could be implemented as shown in FIG. 2A or FIG. 7, with a processor such as the processing unit 200 or the CPU 714 and a non-transitory computer readable storage medium such as the memory 208, the mass storage 704 or the memory 708 storing programming for execution by the processor. The programming includes instructions to perform actions in accordance with a UE method, which in an embodiment involves receiving a UL control channel assignment from a base station in a communication network. The UL control channel assignment indicates a first transmission resource in a first symbol of the uplink control channel, the uplink control channel includes at least the first symbol and a second symbol, and the first symbol and the second symbol have different numerologies at a same sub-band. The method also involves transmitting data or a combination of data and control information using the first transmission resource in the first symbol of the uplink control channel to the base station.

Programming for execution by a processor could include instructions to perform other UE operations as disclosed herein, in any of various ways consistent with the present disclosure.

Other embodiments are also possible.

For example, in accordance with an embodiment of the invention, a method for data receiving at a base station is provided. The base station receives a first data using a first transmission resource in a first symbol of an uplink control channel from a first UE. The base station receives a first UL control information using a second transmission resource in a second symbol of the uplink control channel from a second UE as well. The first symbol and the second symbol have different numerologies at a same sub band. A network device for implementing the method is also provided as an embodiment.

In accordance with an implementation of the embodiment, the first symbol splits two or more shorter symbols, and the two or more shorter symbols have scalable numerologies associated with the first symbol.

In accordance with an implementation of the embodiment or a further implementation based on implementation provided previously when applicable, the method further includes dynamic splitting, by the BS, the first symbol to two or more shorter symbols; or pre-configured, by the BS, the first symbol to two or more shorter symbols.

In accordance with an implementation of the embodiment or a further implementation based on implementation provided previously when applicable, the method further includes dividing, by the BS, the sub band into at least a first partial sub band and a second partial sub band.

In accordance with an implementation of the embodiment or a further implementation based on implementation provided previously when applicable, the method further includes adjusting, by the BS, the division location the first partial sub band and the second partial sub band.

In accordance with an implementation of the embodiment or a further implementation based on implementation provided previously when applicable, the adjusting step further includes adjusting, by the BS, the division range of the sub band as zero.

In accordance with an implementation of the embodiment or a further implementation based on implementation provided previously when applicable, each of the first symbol and the second symbol comprises multiple transmission regions assigned for grant based UE, grant free UE or the combination of grant based UE, grant free UE.

In accordance with an implementation of the embodiment or a further implementation based on implementation provided previously when applicable, the first UE and the second UE are the same UE or different UE.

In accordance with an implementation of the embodiment or a further implementation based on implementation provided previously when applicable, each of the first partial sub band and the second partial sub band includes a first group of symbols for data transmission and a second group of symbols for control message transmission.

In accordance with another embodiment of the invention, a method for UE is provided. The method includes receiving, by the UE, an UL control channel assignment from a base station. The UL control channel assignment indicates a first transmission resource in a first symbol of the uplink control channel. The uplink control channel includes at least the first symbol and a second symbol, and the first symbol and the second symbol have different numerologies at a same sub band. The UE transmits a first data using the first transmission resource in the first symbol of the uplink control channel to the BS. An apparatus for implementing the method is also provided as an embodiment.

In accordance with an implementation of the embodiment, the first symbol splits two or more shorter symbols, and the two or more shorter symbols have scalable numerologies associated with the first symbol.

In accordance with an implementation of the embodiment or a further implementation based on implementation provided previously when applicable, each of the first symbol and the second symbol comprises multiple transmission regions assigned for grant based UE, grant free UE or the combination of grant based UE, grant free UE.

In accordance with an implementation of the embodiment or a further implementation based on implementation provided previously when applicable, the sub band into comprises at least a first partial sub band and a second partial sub band.

In accordance with an implementation of the embodiment or a further implementation based on implementation provided previously when applicable, each of the first partial sub band and the second partial sub band comprises a first group of symbols for data transmission and a second group of symbols for control message transmission.

The previous description of some embodiments is provided to enable any person skilled in the art to make or use an apparatus, method, or processor readable medium according to the present disclosure.

Various modifications to the embodiments described herein may be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

What is claimed is:

1. A method, performed by a base station in a communication network, the method comprising:
   receiving an uplink data transmission using a first transmission resource in a first symbol of an uplink control channel;
   receiving uplink data or control information using a second transmission resource in a second symbol of the uplink control channel;
   wherein the uplink control channel is within a frequency sub-band that comprises a first partial sub-band with a sub-carrier spacing of 30 kHz and a second partial sub-band with a sub-carrier spacing of 60 kHz;
   wherein the first symbol is within the first partial sub-band with the sub-carrier spacing of 30 kHz;
   wherein the second symbol is within the second partial sub-band with the sub-carrier spacing of 60 kHz;
   the method further comprising: receiving further uplink data or control information using a third transmission resource in a third symbol of the uplink control channel, the third symbol within the second partial sub-band with the sub-carrier spacing of 60 kHz;
   wherein a time duration of the first symbol is twice a time duration of the second symbol and is twice a time duration of the third symbol; and
   wherein a start of the first symbol within the first partial sub-band is time aligned with a start of the second symbol within the second partial sub-band, and an end of the first symbol within the first partial sub-band is time aligned with an end of the third symbol within the second partial sub-band.

2. The method of claim 1, wherein the second symbol and the third symbol comprise a 30 kHz split symbol that is split into two 60 kHz symbols.

3. The method of claim 2, further comprising:
   dynamic splitting, by the base station, of the split symbol into the second symbol and the third symbol; or
   pre-configured splitting, by the base station, of the first symbol into the second symbol and the third symbol.

4. The method of claim 1, further comprising:
   dividing, by the base station, the frequency sub-band into at least the first partial sub-band and the second partial sub-band.

5. The method of claim 4, further comprising:
   adjusting, by the base station, a division location between the first partial sub-band and the second partial sub-band.

6. The method of claim 5, the adjusting further comprising:
   adjusting, by the base station, a division range of the frequency sub-band as zero to set one of the partial sub-bands to zero.

7. The method of claim 4, wherein each of the first partial sub-band and the second partial sub-band includes a first group of symbols for data transmissions and a second group of symbols for control message transmissions.

8. The method of claim 1, wherein at least the first symbol comprises multiple transmission regions assigned for grant based user equipment (UE) transmission, grant free UE transmission or a combination of grant based UE transmission and grant free UE transmission.

9. The method of claim 8, wherein the multiple transmission regions provide multiple scheduling request opportunities or uplink sounding signals for UEs in a time period on a dedicated basis, on a contention basis, or both.

10. The method of claim 1, wherein the uplink data transmission received using the first transmission resource in the first symbol of the uplink control channel comprises an associated physical uplink shared channel (PUSCH) transmission, and the data or control information received using the second transmission resource in the second symbol of the uplink control channel comprises associated PUSCH or physical uplink control channel (PUCCH) transmissions.

11. The method of claim 1, wherein the first symbol within the first partial sub-band with the sub-carrier spacing of 30 kHz is multiplexed, with the second symbol and the third symbol within the second partial sub-band with the sub-carrier spacing of 60 kHz, by frequency resources within a same symbol period and the same frequency sub-band.

12. The method of claim 2, wherein the second symbol and the third symbol within the second partial sub-band with the sub-carrier spacing of 60 kHz have scalable numerologies that have a scalable relationship with both the split symbol and the first symbol within the first partial sub-band with the sub-carrier spacing of 30 kHz.

13. A non-transitory processor-readable medium storing instructions which, when executed by one or more processors, cause the one or more processors to perform actions comprising:
   receiving at a base station in a communication network, an uplink data transmission using a first transmission resource in a first symbol of an uplink control channel;
   receiving at the base station, uplink control information using a second transmission resource in a second symbol of the uplink control channel;
   wherein the uplink control channel is within a frequency sub-band that comprises a first partial sub-band with a sub-carrier spacing of 30 kHz and a second partial sub-band with a sub-carrier spacing of 60 kHz;
   wherein the first symbol is within the first partial sub-band with the sub-carrier spacing of 30 kHz;
   wherein the second symbol is within the second partial sub-band with the sub-carrier spacing of 60 kHz;
   the programming further including instructions to perform: receiving at the base station, further uplink data or control information using a third transmission resource in a third symbol of the uplink control channel, the third symbol within the second partial sub-band with the sub-carrier spacing of 60 kHz;
   wherein a time duration of the first symbol is twice a time duration of the second symbol and is twice a time duration of the third symbol; and
   wherein a start of the first symbol within the first partial sub-band is time aligned with a start of the second symbol within the second partial sub-band, and an end of the first symbol within the first partial sub-band is time aligned with an end of the third symbol within the second partial sub-band.

14. A network device comprising:
   a processor; and
   a non-transitory computer readable storage medium storing programming for execution by the processor, the programming including instructions to perform actions comprising:
   receiving an uplink data transmission using a first transmission resource in a first symbol of an uplink control channel;

receiving uplink data or control information using a second transmission resource in a second symbol of the uplink control channel;

wherein the uplink control channel is within a frequency sub-band that comprises a first partial sub-band with a sub-carrier spacing of 30 kHz and a second partial sub-band with a sub-carrier spacing of 60 kHz;

wherein the first symbol is within the first partial sub-band with the sub-carrier spacing of 30 kHz;

wherein the second symbol is within the second partial sub-band with the sub-carrier spacing of 60 kHz;

the programming further including instructions to perform: receiving further uplink data or control information using a third transmission resource in a third symbol of the uplink control channel, the third symbol within the second partial sub-band with the sub-carrier spacing of 60 kHz;

wherein a time duration of the first symbol is twice a time duration of the second symbol and is twice a time duration of the third symbol; and wherein a start of the first symbol within the first partial sub-band is time aligned with a start of the second symbol within the second partial sub-band, and an end of the first symbol within the first partial sub-band is time aligned with an end of the third symbol within the second partial sub-band.

15. The network device of claim 14, wherein the second symbol and the third symbol comprise a 30 kHz split symbol that is split into two 60 kHz symbols.

16. The network device of claim 15, wherein the programming includes instructions to perform dynamic splitting of the split symbol into the second symbol and the third symbol; or pre-configured splitting of the first split symbol into the second symbol and the third symbol.

17. The network device of claim 14, wherein the programming includes instructions to perform dividing the frequency sub-band into at least the first partial sub-band and the second partial sub-band.

18. The network device of claim 17, wherein the programming includes instructions to perform adjusting a division location between the first partial sub-band and the second partial sub-band.

19. The network device of claim 17, wherein the programming includes instructions to perform the adjusting by adjusting a division range of the frequency sub-band as zero to set one of the partial sub-bands to zero.

20. The network device of claim 17, wherein each of the first partial sub-band and the second partial sub-band includes a first group of symbols for data transmissions and a second group of symbols for control message transmissions.

21. The network device of claim 14, wherein each of at least the first symbol comprises multiple transmission regions assigned for grant based User Equipment (UE) transmission, grant free UE transmission or a combination of grant based UE transmission and grant free UE transmission.

22. The network device of claim 21, wherein the multiple transmission regions provide multiple scheduling request opportunities or uplink sounding signals for UEs in a time period on a dedicated basis, on a contention basis, or both.

23. The network device of claim 14, wherein the uplink data transmission received using the first transmission resource in the first symbol of the UL control channel comprises an associated physical uplink shared channel (PUSCH) transmission, and the data or control information received using the second transmission resource in the second symbol of the uplink control channel comprises associated PUSCH or physical uplink control channel (PUCCH) transmissions.

24. The network device of claim 14, wherein the first symbol within the first partial sub-band with the sub-carrier spacing of 30 kHz is multiplexed, with the second symbol and the third symbol within the second partial sub-band with the sub-carrier spacing of 60 kHz, by frequency resources within a same symbol period and the same frequency sub-band.

25. The network device of claim 15, wherein the second symbol and the third symbol within the second partial sub-band with the sub-carrier spacing of 60 kHz have scalable numerologies that have a scalable relationship with both the split symbol and the first symbol within the first partial sub-band with the sub-carrier spacing of 30 kHz.

* * * * *

UNITED STATES PATENT AND TRADEMARK OFFICE
CERTIFICATE OF CORRECTION

PATENT NO. : 10,856,317 B2
APPLICATION NO. : 15/588440
DATED : December 1, 2020
INVENTOR(S) : Jianglei Ma et al.

Page 1 of 1

It is certified that error appears in the above-identified patent and that said Letters Patent is hereby corrected as shown below:

In the Claims

At Column 40, Line 10, Claim 21:
"The network device of claim 14, wherein each of at"
Should be:
-- The network device of claim 14, wherein at" --

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*